(12) United States Patent
Zhou

(10) Patent No.: US 11,055,814 B2
(45) Date of Patent: Jul. 6, 2021

(54) PANORAMIC VIDEO WITH INTEREST POINTS PLAYBACK AND THUMBNAIL GENERATION METHOD AND APPARATUS

(71) Applicant: HUAWEI TECHNOLOGIES CO., LTD., Guangdong (CN)

(72) Inventor: Haojun Zhou, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/366,807

(22) Filed: Mar. 27, 2019

(65) Prior Publication Data

US 2019/0220953 A1 Jul. 18, 2019

Related U.S. Application Data

(63) Continuation of application No. PCT/CN2017/090907, filed on Jun. 29, 2017.

(30) Foreign Application Priority Data

Sep. 29, 2016 (CN) .......................... 201610872107.4

(51) Int. Cl.
*G06T 3/40* (2006.01)
*H04N 21/431* (2011.01)
(Continued)

(52) U.S. Cl.
CPC ............ *G06T 3/0062* (2013.01); *G03B 37/04* (2013.01); *G06T 3/005* (2013.01); *G06T 3/4038* (2013.01);
(Continued)

(58) Field of Classification Search
CPC ................ G06T 3/4038; H04N 21/431; H04N 21/47217; H04N 21/4728; H04N 2201/325
See application file for complete search history.

(56) References Cited

U.S. PATENT DOCUMENTS 6,374,260 B1 * 4/2002 Hoffert ................. G10H 1/0058
8,990,690 B2 * 3/2015 Lin ................. H04N 21/234327
715/716

(Continued)

FOREIGN PATENT DOCUMENTS

CN 104301769 A 1/2015
CN 105100961 A 11/2015
(Continued)

OTHER PUBLICATIONS

International Search Report dated Sep. 25, 2017 in corresponding International Application No. PCT/CN2017/090907.

*Primary Examiner* — Jamie J Atala
*Assistant Examiner* — Michael Robert Cammarata
(74) *Attorney, Agent, or Firm* — Slater Matsil, LLP

(57) ABSTRACT

A panoramic video playback method is provided, and the method includes: determining, by a client, that a user chooses to jump to play a video corresponding to a jump time point in a panoramic video; matching, by the client, the time point and a time range of each of at least one interest point included in the panoramic video; determining, by the client, a user's field of view in which an area of the matched interest point in a panoramic area of the panoramic video can be viewed; and obtaining, by the client, a video corresponding to the time point in the panoramic video, and jumping to play the video corresponding to the time point when the user's field of view is used.

10 Claims, 14 Drawing Sheets

(51) Int. Cl.
*H04N 21/4728* (2011.01)
*H04N 21/472* (2011.01)
*G06T 3/00* (2006.01)
*G03B 37/04* (2021.01)
*H04N 21/81* (2011.01)

(52) U.S. Cl.
CPC ......... *H04N 21/431* (2013.01); *H04N 21/472* (2013.01); *H04N 21/4728* (2013.01); *H04N 21/81* (2013.01)

(56) References Cited

U.S. PATENT DOCUMENTS

| | | | |
|---|---|---|---|
| 9,094,655 B2 | 7/2015 | Suzuki | |
| 10,230,866 B1* | 3/2019 | Townsend | H04N 1/2108 |
| 2004/0263636 A1* | 12/2004 | Cutler | H04N 7/15 |
| | | | 348/211.12 |
| 2006/0120624 A1* | 6/2006 | Jojic | G06F 16/739 |
| | | | 382/284 |
| 2008/0106594 A1* | 5/2008 | Thrun | G06T 19/003 |
| | | | 348/39 |
| 2013/0336627 A1* | 12/2013 | Calvert | H04N 5/772 |
| | | | 386/224 |
| 2015/0098691 A1* | 4/2015 | Avrahami | H04N 5/783 |
| | | | 386/241 |
| 2015/0139601 A1* | 5/2015 | Mate | H04N 5/222 |
| | | | 386/223 |
| 2015/0207988 A1* | 7/2015 | Tracey | H04N 5/23293 |
| | | | 348/36 |
| 2015/0254871 A1 | 9/2015 | MacMillan et al. | |
| 2015/0256746 A1 | 9/2015 | MacMillan et al. | |
| 2015/0331242 A1* | 11/2015 | Cho | H04N 5/265 |
| | | | 345/8 |
| 2016/0029105 A1* | 1/2016 | Newman | H04N 13/178 |
| | | | 386/281 |
| 2016/0092561 A1* | 3/2016 | Liu | G06F 16/739 |
| | | | 386/230 |
| 2017/0019604 A1* | 1/2017 | Kim | H04N 5/23238 |
| 2017/0038942 A1* | 2/2017 | Rosenfeld | H04N 5/23238 |
| 2017/0039881 A1* | 2/2017 | Belch | H04N 5/2628 |
| 2017/0139578 A1* | 5/2017 | Dickerson | G06F 3/04815 |
| 2017/0195727 A1 | 7/2017 | Di et al. | |
| 2017/0316806 A1* | 11/2017 | Warren | G11B 27/031 |
| 2018/0192146 A1 | 7/2018 | Lian et al. | |
| 2019/0130193 A1* | 5/2019 | Leppanen | G06F 16/70 |
| 2019/0149886 A1* | 5/2019 | Eronen | H04N 21/4438 |
| | | | 725/86 |
| 2019/0273837 A1* | 9/2019 | Townsend | H04N 1/2108 |
| 2020/0084428 A1* | 3/2020 | Oh | H04N 21/2343 |

FOREIGN PATENT DOCUMENTS

| | | |
|---|---|---|
| CN | 105357585 A | 2/2016 |
| CN | 105516755 A | 4/2016 |
| CN | 105898139 A | 8/2016 |

* cited by examiner

Panoramic video

Panoramic video

Tile 1    Tile 2    Tile 3    Tile 4

Panoramic video

PANORAMIC VIDEO WITH INTEREST POINTS PLAYBACK AND THUMBNAIL GENERATION METHOD AND APPARATUS

CROSS-REFERENCE TO RELATED APPLICATIONS

This application is a continuation of International Application No. PCT/CN2017/090907, filed on Jun. 29, 2017, which claims priority to Chinese Patent Application No. 201610872107.4, filed on Sep. 29, 2016, the disclosures of the aforementioned applications are hereby incorporated by reference in their entireties.

TECHNICAL FIELD

The present disclosure relates to the field of multimedia technologies, and in particular, to a panoramic video playback method and apparatus.

BACKGROUND

A panoramic video is also referred to as a 360-degree video. The panoramic video is generated in the following manner: A plurality of video streams are obtained by photographing the environment by using a plurality of cameras, and then the plurality of video streams are combined by using technologies, such as synchronization, stitching, and projection. The panoramic video includes information about the environment from all directions.

Due to a limited field of view (approximately 120 degrees) of human eyes and a limited field of view of a video display device (for example, a field of view of a head-mounted device is usually 96 to 110 degrees), when a user views a panoramic video, the user can view only some areas in a panoramic area of the panoramic video, and the user can view different location areas in the panoramic area of the panoramic video by changing a viewing angle. A user's current visual area is usually referred to as a user's current field of view (FOV).

A client configured to play a panoramic video may provide a user with information about an interest point in the panoramic video. The interest point is a video image that is in the panoramic video and in which the user may be interested, and the information about the interest point may include a time range of each interest point in the panoramic video and a text description of the interest point. In the prior art, when the user chooses to jump to play a video corresponding to an interest point in the panoramic video, the client jumps, in a user's current field of view, from a currently played video to the video corresponding to the interest point. However, the interest point may exist only in some areas in a panoramic area of the panoramic video, and an area of the interest point may be inconsistent with the user's current field of view. Therefore, the client cannot locate the area of the interest point when jumping to the video corresponding to the interest point, and therefore cannot display the area of the interest point in the panoramic area for the user. Consequently, user experience of viewing the panoramic video is relatively poor. In addition, in a current process of playing the panoramic video for the user by the client, when the client needs to display a thumbnail of some frames in the panoramic video for the user, the client cannot locate an area of an interest point. Consequently, the client cannot display, for the user, a thumbnail including the area of the interest point, and user experience of viewing the panoramic video is relatively poor.

In conclusion, an area of an interest point cannot be located in an existing technical solution in which a client plays a panoramic video for a user. Consequently, user experience of viewing the panoramic video is relatively poor.

SUMMARY

Embodiments of the present invention provide a panoramic video playback method and apparatus, to resolve a problem that an area of an interest point cannot be located in an existing technical solution in which a client plays a panoramic video for a user, thereby improving user experience of viewing the panoramic video.

According to a first aspect, an embodiment of the present invention provides a panoramic video playback method, including:

determining, by a client, that a user chooses to jump to play a video corresponding to a jump time point in a panoramic video;

matching, by the client, the time point and a time range of each of at least one interest point included in the panoramic video;

when finding that the time point falls within a time range of an interest point, determining, by the client, a user's field of view in which an area of the matched interest point in a panoramic area of the panoramic video can be viewed; and obtaining, by the client, a video corresponding to the time point in the panoramic video when the user's field of view is used, and jumping to play the video corresponding to the time point when the user's field of view is used.

The panoramic video may include the at least one interest point, and the interest point is a video image that is in the panoramic video and in which the user may be interested. The time range of the interest point is a time period between a start time and an end time of the interest point.

In the foregoing method, after the client determines that the user chooses to jump to play the video corresponding to the jump time point in the panoramic video, a user's field of view used by the client when the client jumps to play the video for the user is the user's field of view in which the area, of the interest point that matches the jump time point, in the panoramic area of the panoramic video can be viewed. Therefore, the following problem is resolved: In an existing technical solution in which a client plays a panoramic video for a user, the client cannot display an area of an interest point in a panoramic area for the user when jumping to a video corresponding to the interest point.

In a possible design, before the client matches the time point and the time range of each of the at least one interest point included in the panoramic video, the client obtains, from a server, description information of each of the at least one interest point included in the panoramic video, where the description information of the interest point includes the time range of the interest point and an area of the interest point.

The description information that is of the interest point and that is obtained by the client may be used to: perform matching to determine whether the user-selected jump time point falls within the time range of the interest point, and after finding that the user-selected jump time point falls within the time range of the interest point, determine a user's field of view based on the area of the matched interest point.

In a possible design, the client determines, by using the following method, the user's field of view in which the area of the matched interest point in the panoramic area of the panoramic video can be viewed:

determining, by the client, the area of the matched interest point; and calculating, by the client, the user's field of view based on the area of the matched interest point, and setting a field of view parameter of the client to the user's calculated field of view, where the field of view parameter of the client is used to represent a parameter of a user's field of view used by the client when the user views the panoramic video by using the client.

Further, the client may calculate the user's field of view based on the area of the matched interest point by using the following method:

selecting, by the client, a pair of coordinates in the area of the matched interest point, and extracting, by using the coordinates as reference coordinates and in a coordinate alignment manner, an area that matches a size of the field of view from the panoramic area of the panoramic video as the user's field of view.

It should be noted that if a size of the area of the matched interest point matches the size of the field of view, the client may directly determine the area of the interest point as the user's field of view. This can avoid calculating the user's field of view in the coordinate alignment manner, to reduce method complexity.

In a possible design, before the client calculates the user's field of view based on the area of the matched interest point, the client determines that a user's current field of view used by the client when the user chooses to jump to play the panoramic video does not match the area of the matched interest point, and performs, based on the determining, the operation of calculating the user's field of view based on the area of the matched interest point.

That a user's current field of view does not match the area of the matched interest point includes but is not limited to the following content:

a size of an overlapping area between the user's current field of view and the area of the matched interest point is less than or equal to a first threshold; or an angle between a vector of the user's current field of view and a vector of the area of the matched interest point is greater than or equal to a second threshold; or an angle between a rotation angle of the user's current field of view and a rotation angle of the area of the matched interest point is greater than or equal to a third threshold.

Before calculating the user's field of view based on the area of the matched interest point, the client may determine whether the area of the matched interest point is suitable for calculating the user's field of view. This can improve accuracy of calculating the user's field of view.

In a possible design, the client may obtain, in the following two manners, the video corresponding to the time point in the panoramic video when the user's field of view is used.

Manner 1: The client obtains, from the server, the video corresponding to the time point in the panoramic video, and generates, based on the user's field of view and the video corresponding to the time point, the video corresponding to the time point when the user's field of view is used. This manner is mainly applicable to a scenario in which the panoramic video is transmitted between the client and the server in a full-image transmission manner.

Manner 2: The client obtains, from the server, the video corresponding to the time point in the panoramic video when the user's field of view is used. This manner is mainly applicable to a scenario in which the panoramic video is transmitted between the client and the server in a tile-based transmission manner or a field-of-view-based transmission manner.

According to a second aspect, an embodiment of the present invention provides a panoramic video playback method, including:

determining, by a video playback system, that a user chooses to display a thumbnail corresponding to a specific time point in a panoramic video;

matching, by the video playback system, the time point and a time range of each of at least one interest point included in the panoramic video;

when finding that the time point falls within a time range of an interest point, determining, by the video playback system, an area of the matched interest point in a panoramic area of the panoramic video as a user's field of view; and obtaining, by the video playback system, an image that is in a specified frame in the panoramic video and that falls within the user's field of view, and generating a thumbnail based on the image, where the specified frame includes at least one key frame before/after the time point.

The video playback system includes a client and a server. The client may generate the thumbnail by using the foregoing method, or the server may generate the thumbnail by using the foregoing method, and then the client displays the thumbnail for the user.

In the foregoing method, after the video playback system determines that the user chooses to display the thumbnail corresponding to the specific time point in the panoramic video, a user's field of view used for the generated thumbnail is the area, of the interest point that matches the user-selected specific time point, in the panoramic area of the panoramic video. Therefore, the client displays a thumbnail of a related frame near the interest point in the panoramic video for the user. This improves user experience of viewing the panoramic video.

In a possible design, when finding that the time point does not fall within a time range of any interest point, the video playback system determines a user's current field of view in the panoramic area of the panoramic video as the user's field of view.

In a possible design, before the video playback system matches the time point and the time range of each of the at least one interest point included in the panoramic video, the video playback system obtains description information of each of the at least one interest point included in the panoramic video, where the description information of the interest point includes the time range of the interest point and an area of the interest point.

The description information that is of the interest point and that is obtained by the video playback system may be used to: perform matching to determine whether the user-selected specific time point falls within the time range of the interest point, and after finding that the user-selected specific time point falls within the time range of the interest point, determine a user's field of view based on the area of the matched interest point.

In a possible design, the video playback system obtains, by using the following method, the image that is in the specified frame in the panoramic video and that falls within the user's field of view:

obtaining, by the video playback system, a panoramic image corresponding to the specified frame in the panoramic video;

establishing a 3D image model for the panoramic image; and obtaining a projection image, on the 3D image model, of an area corresponding to the user's field of view.

According to a third aspect, an embodiment of the present invention provides a panoramic video playback apparatus, including:

a jump determining unit, configured to determine that a user chooses to jump to play a video corresponding to a jump time point in a panoramic video;

an interest point matching unit, configured to match the time point determined by the jump determining unit and a time range of each of at least one interest point included in the panoramic video;

a field of view determining unit, configured to: when the interest point matching unit finds that the time point falls within a time range of an interest point, determine a user's field of view in which an area of the matched interest point in a panoramic area of the panoramic video can be viewed; and a jump playback unit, configured to: obtain a video corresponding to the time point in the panoramic video when the user's field of view determined by the field of view determining unit is used, where the time point is determined by the jump determining unit, and jump to play the video corresponding to the time point when the user's field of view is used.

In a possible design, the apparatus further includes:

an information obtaining unit, configured to: before the interest point matching unit matches the time point and the time range of each of the at least one interest point included in the panoramic video, obtain, from a server, description information of each of the at least one interest point included in the panoramic video, where the description information of the interest point includes the time range of the interest point and an area of the interest point.

In a possible design, the field of view determining unit is specifically configured to:

determine the area of the matched interest point; and calculate the user's field of view based on the area of the matched interest point, and set a field of view parameter of a client to the user's calculated field of view, where the field of view parameter of the client is used to represent a parameter of a user's field of view used by the client when the user views the panoramic video by using the client.

In a possible design, the field of view determining unit is further configured to:

before calculating the user's field of view based on the area of the matched interest point, determine that a user's current field of view used by the client when the user chooses to jump to play the panoramic video does not match the area of the matched interest point, and perform, based on the determining, the operation of calculating the user's field of view based on the area of the matched interest point.

In a possible design, that a user's current field of view does not match the area of the matched interest point includes:

a size of an overlapping area between the user's current field of view and the area of the matched interest point is less than or equal to a first threshold; or an angle between a vector of the user's current field of view and a vector of the area of the matched interest point is greater than or equal to a second threshold; or an angle between a rotation angle of the user's current field of view and a rotation angle of the area of the matched interest point is greater than or equal to a third threshold.

In a possible design, when calculating the user's field of view based on the area of the matched interest point, the field of view determining unit is specifically configured to:

select a pair of coordinates in the area of the matched interest point, and extract, by using the coordinates as reference coordinates and in a coordinate alignment manner, an area that matches a size of the field of view from the panoramic area of the panoramic video as the user's field of view.

In a possible design, when obtaining the video corresponding to the time point in the panoramic video when the user's field of view is used, the jump playback unit is specifically configured to:

obtain, from the server, the video corresponding to the time point in the panoramic video, and generate, based on the user's field of view and the video corresponding to the time point, the video corresponding to the time point when the user's field of view is used; or obtain, from the server, the video corresponding to the time point in the panoramic video when the user's field of view is used.

According to a fourth aspect, an embodiment of the present invention provides a panoramic video playback apparatus, including:

a time determining unit, configured to determine that a user chooses to display a thumbnail corresponding to a specific time point in a panoramic video;

an interest point matching unit, configured to match the time point determined by the time determining unit and a time range of each of at least one interest point included in the panoramic video;

a field of view determining unit, configured to: when the interest point matching unit finds that the time point falls within a time range of an interest point, determine an area of the matched interest point in a panoramic area of the panoramic video as a user's field of view; and a thumbnail generation unit, configured to: obtain an image that is in a specified frame in the panoramic video and that falls within the user's field of view, and generate a thumbnail based on the image, where the specified frame includes at least one key frame before/after the time point.

In a possible design, the field of view determining unit is further configured to:

when the interest point matching unit finds that the time point does not fall within a time range of any interest point, determine a user's current field of view in the panoramic area of the panoramic video as the user's field of view.

In a possible design, the apparatus further includes:

an information obtaining unit, configured to: before the interest point matching unit matches the time point and the time range of each of the at least one interest point included in the panoramic video, obtain description information of each of the at least one interest point included in the panoramic video, where the description information of the interest point includes the time range of the interest point and an area of the interest point.

In a possible design, when obtaining the image that is in the specified frame in the panoramic video and that falls within the user's field of view, the thumbnail generation unit is specifically configured to:

obtain a panoramic image corresponding to the specified frame in the panoramic video;

establish a 3D image model for the panoramic image; and obtain a projection image, on the 3D image model, of an area corresponding to the user's field of view.

DESCRIPTION OF EMBODIMENTS

Figure 1A:
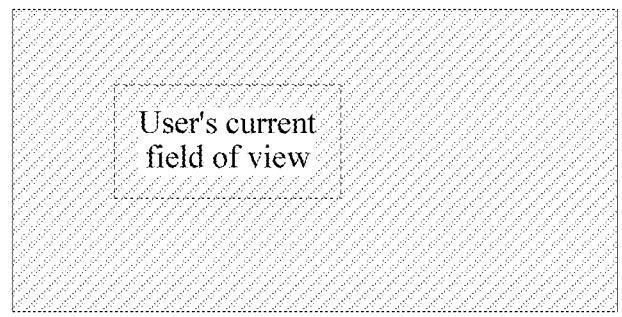
FIG. 1A is a schematic diagram in which a server transmits a panoramic video to a client in a full-image transmission manner.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The embodiments of the present invention provide a panoramic video playback method, a client, and a server. The method, the client, and the server are based on a same inventive concept. Because the method, the client, and the server have similar problem-resolving principles, mutual reference may be made between implementations of the client, the server, and the method, and no repeated description is provided.

The client and the server are used in the technical solutions provided in the embodiments of the present invention. The client is corresponding to the server, and provides a user with a local service program. The client used in the embodiments of the present invention has a function of playing a panoramic video for the user, and a panoramic video player runs on the client. The player may be an application installed on the client, or may be a page on a browser. The client may be a wireless terminal device or a wired terminal device. The wireless terminal device may be a handheld device with a wireless connection function, or another processing device connected to a wireless modem. The wireless terminal device may communicate with one or more core networks by using a radio access network (Radio Access Network, RAN). The wireless terminal device may be a mobile terminal device such as a mobile phone (or referred to as a "cellular" phone), or a computer with a mobile terminal device. For example, the wireless terminal device may be a portable, pocket-sized, handheld, computer built-in, or in-vehicle mobile apparatus that exchanges voice and/or data with the radio access network. The wired terminal device may be a cable TV, a wired computer, or the like. The server is a device that provides a computing service, the server may respond to a service request of the client, and the server has a function of undertaking the service and guaranteeing the service. The server used in the embodiments of the present invention has a function of providing the panoramic video for the client. Similar to an architecture of a general-purpose computer, an architecture of the server usually includes a processor, a hard disk, a memory, a system bus, and the like, and the server has relatively high requirements for a processing capability, reliability, stability, security, scalability, manageability, and the like. For example, the server may be a personal computer (Personal Computer, PC) server. Communication between the client and the server supports universal streaming protocols, such as the Real-Time Transport Protocol (Real-Time Transport Protocol, RTP), the Real-Time Streaming Protocol (Real-Time Streaming Protocol, RTSP), the Hypertext Transfer Protocol (Hypertext Transfer Protocol, HTTP), the Dynamic Adaptive Streaming over HTTP (Dynamic Adaptive Streaming over HTTP, DASH) protocol, and the HTTP Live Streaming (HTTP Live Streaming, HLS) protocol.

Embodiments of the present invention relate to a panoramic video playback scenario. A panoramic video is also referred to as a 360-degree video. The panoramic video is generated in the following manner: A plurality of video streams are obtained by photographing the environment by using a plurality of cameras, and then the plurality of video streams are combined by using technologies, such as synchronization, stitching, and projection. The panoramic video includes information about the environment from all directions. Due to a limited field of view (approximately 120 degrees) of human eyes and a limited field of view of a video display device (for example, a field of view of a head-mounted device is usually 96 to 110 degrees), when a user views a panoramic video, the user can view only some areas in a panoramic area of the panoramic video, and the user can view different location areas in the panoramic area of the panoramic video by changing a viewing angle. A user's visual area is usually referred to as a user's field of view.

A server provides a panoramic video for a client, so that the client plays the panoramic video for a user. The server usually transmits the panoramic video to the client in the following three transmission manners:

Full-image transmission manner: The server codes an entire panoramic image in a video coding form, such as the H.264 or the H.265, and transmits a coded panoramic image to the client, and the client receives a complete panoramic video. FIG. 1A shows the full-image transmission manner, and a shadow part in the figure represents transmitted video data.

Figure 1B:
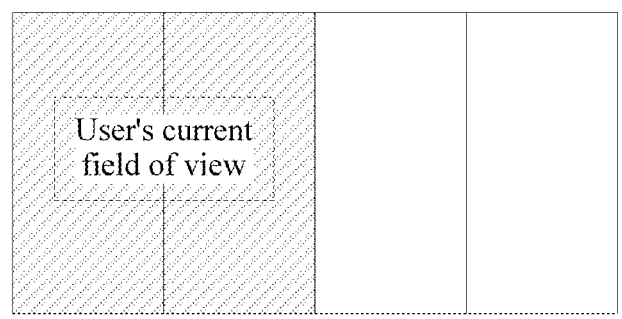
FIG. 1B is a schematic diagram in which a server transmits a panoramic video to a client in a tile-based transmission manner.

Tile-based transmission manner: The server divides a panoramic video into a plurality of tiles (Tile) according to a predefined rule, and independently codes an image of each tile, to generate a plurality of pieces of video data. The server transmits only video data of a tile corresponding to a user's current field of view to the client, and the client receives video data of one or more tiles. FIG. 1B shows the tile-based transmission manner, and a shadow part in the figure represents transmitted video data.

Further, in the tile-based transmission manner, the server may use a high-definition code stream to transmit the video data of the tile corresponding to the user's current field of view, and the server may use a low-definition code stream to transmit video data of another tile, to ensure that the server can quickly present a low-definition image when the user's current field of view changes, thereby reducing a waiting delay.

Figure 1C:
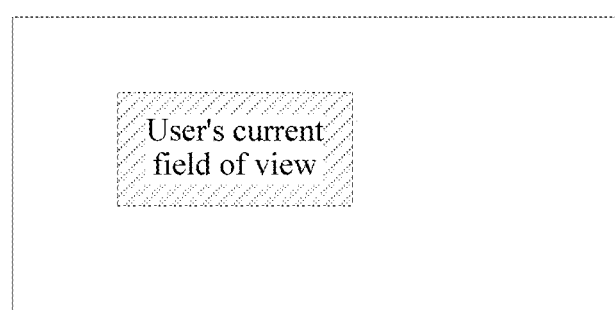
FIG. 1C is a schematic diagram in which a server transmits a panoramic video to a client in a field-of-view-based transmission manner.

Field-of-view-based transmission manner: The server generates, in real time, video data corresponding to a user's current field of view in a panoramic video, and transmits the video data to the client, and the client receives the video data corresponding to the user's current field of view. FIG. 1C shows the field-of-view-based transmission manner, and a shadow part in the figure represents transmitted video data.

An area of an interest point cannot be located in an existing technical solution in which a client plays a panoramic video for a user. Therefore, user experience is relatively poor.

When the user chooses to jump to play a video corresponding to an interest point in a panoramic video, the client jumps, in a user's current field of view, from a currently played video to the video corresponding to the interest point. Because an area of the interest point in a panoramic area may be inconsistent with the user's current field of view. Therefore, the client cannot display the area of the interest point in the panoramic area for the user when jumping to the video corresponding to the interest point. Consequently, user experience is relatively poor.

In addition, the technical solution in which a client plays a panoramic video for a user neither relates to a technical solution in which the client displays a thumbnail of some frames in the panoramic video for the user, nor relates to a technical solution in which the client displays a thumbnail of a related frame near an interest point in the panoramic video for the user. Consequently, user experience is relatively poor.

Therefore, the embodiments of the present invention provide a panoramic video playback method, a client, and a server, to separately resolve the foregoing prior-art problems.

The following describes in detail the technical solutions provided in the embodiments of the present invention by using specific embodiments. It should be noted that a display sequence of the embodiments represents only a sequence of the embodiments, and does not represent a priority sequence of the technical solutions provided in the embodiments.

Embodiment 1

Figure 2:
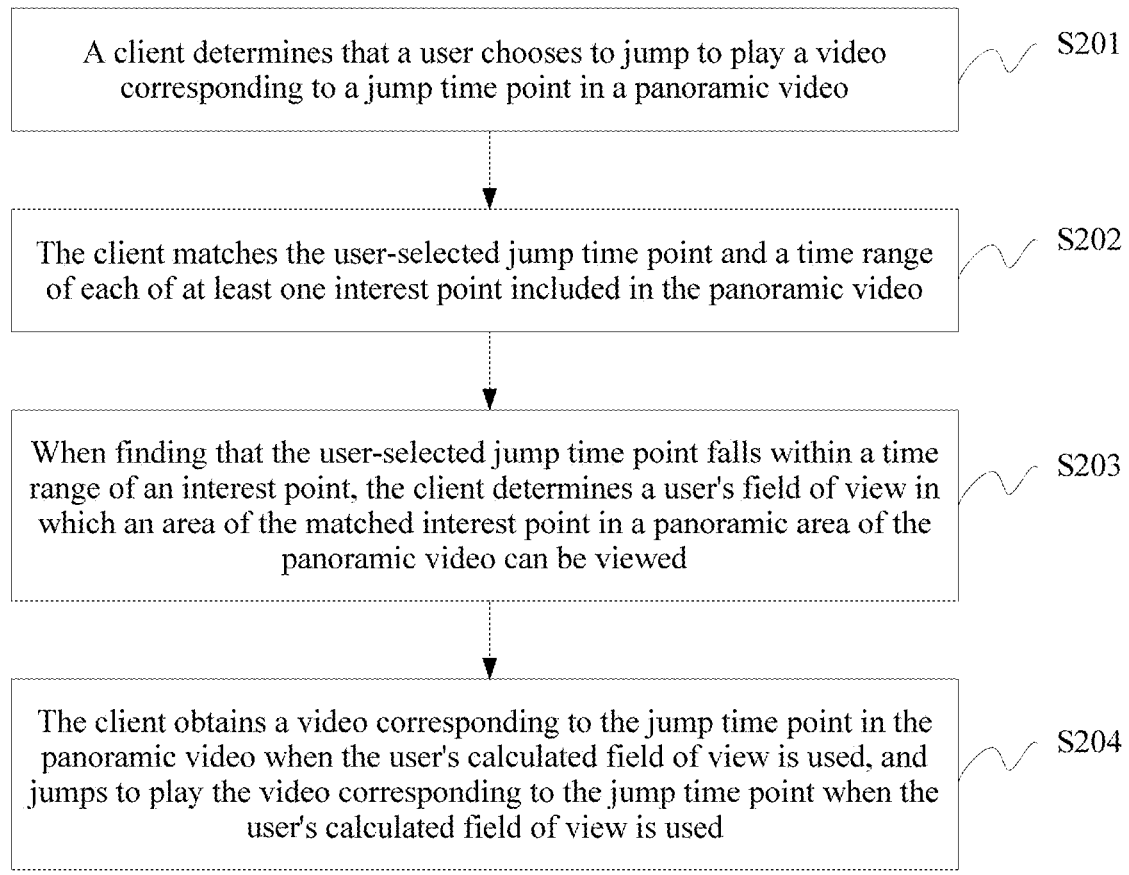
FIG. 2 is a schematic flowchart of a panoramic video playback method according to an embodiment of the present invention.

To resolve a prior-art problem that a client cannot display an area of an interest point for a user when jumping to play a video corresponding to the interest point in a panoramic video, and consequently user experience of viewing the panoramic video is relatively poor, this embodiment of the present invention provides a panoramic video playback method. As shown in FIG. 2, the method includes the following steps.

S201. A client determines that a user chooses to jump to play a video corresponding to a jump time point in a panoramic video.

The client may determine, through interaction with the user, that the user chooses to jump to play the video corresponding to the jump time point in the panoramic video. For example, if the client detects that the user drags a progress bar of the panoramic video to a time point or clicks on a time point on a progress bar of the panoramic video, or if the client determines that the user fast-forwards to a time point by using a fast-forward button, the client determines that the user chooses to jump to play the video corresponding to the jump time point in the panoramic video, and the time point is the jump time point.

S202. The client matches the user-selected jump time point and a time range of each of at least one interest point included in the panoramic video.

The panoramic video may include the at least one interest point, and the interest point is a video image that is in the panoramic video and in which the user may be interested. In terms of the interest point, video content is analyzed by using a content provider or a service provider, to determine a time point that is in the video and in which the user may be interested, and the time point and a description of video content corresponding to the time point are recorded and stored. This process is usually referred to as dotting, and the dotting is usually completed manually or with the aid of computer analysis. The time range of the interest point is a time period between a start time and an end time of the interest point.

Optionally, before S202, the client may obtain, from a server, description information of each of the at least one interest point included in the panoramic video, and the description information of the interest point includes at least the time range of the interest point and an area of the interest point. Further, the description information of the interest point may include content description information of the interest point, and the content description information is used to introduce, to the user, content included in the interest point. For example, the client downloads, from a browser by using a JavaScript script, a file including the description information of the interest point. The client may display the obtained description information of each interest point at a specified location of a display area, for the user to retrieve and browse. For example, the client marks, on the progress bar of the panoramic video, the start time of the interest point, or displays, at a location of the display area, a list including the description information of each interest point.

S203. When finding that the user-selected jump time point falls within a time range of an interest point, the client determines a user's field of view in which an area of the matched interest point in a panoramic area of the panoramic video can be viewed.

Optionally, the client determines, in the following steps, the user's field of view in which the area of the matched interest point in the panoramic area of the panoramic video can be viewed.

Step 1: The client determines the area of the matched interest point.

The client may extract the area of the interest point from description information of the matched interest point. The description information of the interest point may be obtained by the client from the server before S202. The description information of the interest point includes at least the time range of the interest point and the area of the interest point. For related descriptions of the description information of the interest point, refer to S202 and the following Table 1 to Table 4. Details are not described herein again.

Step 2: The client determines whether a user's current field of view used by the client when the user chooses to jump to play the panoramic video matches the area of the matched interest point.

That the client determines whether a user's current field of view used by the client when the user chooses to jump to play the panoramic video matches the area of the matched interest point specifically includes any one or any combination of the following operations:

1. The client determines whether a size of an overlapping area between the user's current field of view and the area of the matched interest point is less than or equal to a first threshold. If the size of the overlapping area is less than or equal to the first threshold, the client determines that the user's current field of view does not match the area of the matched interest point; or if the size of the overlapping area is greater than the first threshold, the client determines that the user's current field of view matches the area of the matched interest point.

For example, if the user's current field of view and the area of the interest point are represented in a form of coordinates, the description information that is of the interest point in the panoramic video and that is obtained by the client is shown in the following Table 1.

TABLE 1

| Parameter | Description |
| --- | --- |
| Number | Number of interest points included in a panoramic video |
| Start, end | Start time and end time of an interest point 1 |
| x, y, w, h | Upper left corner vertex coordinates of an area of the interest point 1 are (x, y), a width of the area of the interest point 1 is w, and a height of the area of the interest point 1 is h |
| Description | Text description information of the interest point 1 |
| Start, end | Start time and end time of an interest point 2 |
| . . . | . . . |

Figure 3A:
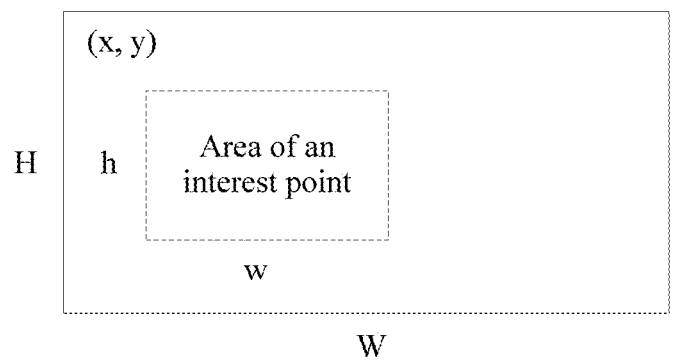
FIG. 3A is a schematic diagram of a panoramic area of a panoramic video according to an embodiment of the present invention.

In Table 1, a time range of the interest point 1 is represented by the start time and the end time, or may be represented by the start time and duration. The area of the interest point 1 in the panoramic video is shown in FIG. 3A.

Figure 3B:
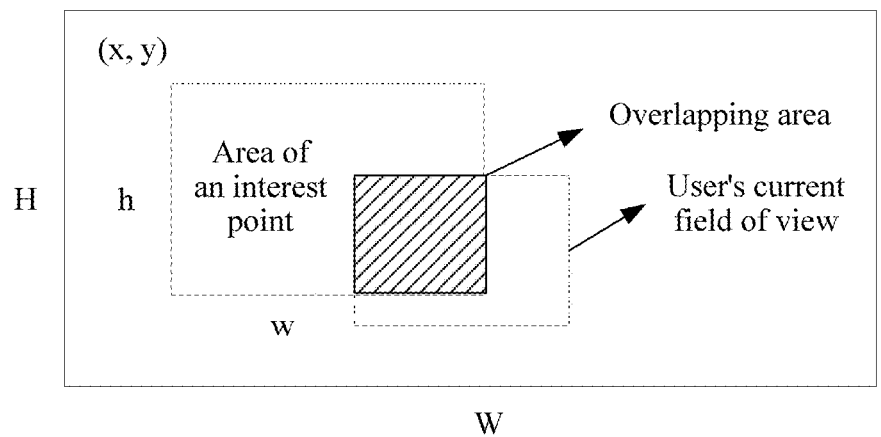
FIG. 3B is another schematic diagram of a panoramic area of a panoramic video according to an embodiment of the present invention.

A shadow part shown in FIG. 3B is an overlapping area between the user's current field of view and the area of the interest point 1. After determining that the user-selected jump time point falls within the time range of the interest point 1 in Table 1, the client compares a size of the overlapping area shown in FIG. 3B with the first threshold. For example, the first threshold is 80% of the user's current field of view. When determining that the size of the overlapping area is less than or equal to the first threshold, the client may determine that the user's current field of view does not match the area of the matched interest point 1.

In Table 1, one interest point includes only one area. In some scenarios, an area of one interest point may change within a time range of the interest point. For example, in a football match, a wonderful goal may include a series of processes from dribbling a ball in a kick-off circle to shooting the ball in a goal area. In consideration of this, in this embodiment, one interest point may be further divided into a plurality of sub-interest points. In this case, the description information of the interest point in the panoramic video is shown in the following Table 2.

TABLE 2

| Parameter | Description |
| --- | --- |
| Number | Number of interest points included in a panoramic video |
| Start, end | Start time and end time of an interest point 1 |
| Description | Text description information of the interest point 1 |
| Period number | Number of sub-interest points included in the interest point 1 |
| Time 1 | Time range of a sub-interest point 1 |
| x, y, w, h | Area of the sub-interest point 1 |
| Time 2 | Time range of a sub-interest point 2 |
| . . . | . . . |

After finding that the user-selected jump time point falls within the time range of the interest point 1, the client further performs matching to determine a sub-interest point in the interest point 1, where the jump time point falls within a time range of the sub-interest point. For example, if the jump time point falls within the time range of the sub-interest point 1 in the interest point 1, the client needs to determine whether a size of an overlapping area between the user's current field of view and the area of the sub-interest point 1 is less than or equal to the first threshold.

2. The client determines whether an angle between a vector of the user's current field of view and a vector of the area of the matched interest point is greater than or equal to a second threshold. If the angle is greater than or equal to the second threshold, the client determines that the user's current field of view does not match the area of the matched interest point; or if the angle is less than the second threshold, the client determines that the user's current field of view matches the area of the matched interest point.

3. The client determines whether an angle between a rotation angle of the user's current field of view and a rotation angle of the area of the matched interest point is greater than or equal to a third threshold. If the angle is greater than or equal to the third threshold, the client determines that the user's current field of view does not match the area of the matched interest point; or if the angle is less than the third threshold, the client determines that the user's current field of view matches the area of the matched interest point.

For example, if the user's current field of view and the area of the interest point are represented in a form of a rotation angle, the description information that is of the interest point in the panoramic video and that is obtained by the client is shown in the following Table 3.

TABLE 3

| Parameter | Description |
| --- | --- |
| Number | Number of interest points included in a panoramic video |
| Start, end | Start time and end time of an interest point 1 |

TABLE 3-continued

| Parameter | Description |
|---|---|
| Pitch | Pitch angle of the interest point 1 |
| Yaw | Yaw angle of the interest point 1 |
| Roll | Roll angle of the interest point 1 |
| Start, end | Start time and end time of an interest point 2 |
| ... | ... |

After the client determines that the user-selected jump time point falls within the time range of the interest point 1 in Table 1, the client determines whether an angle between the rotation angle of the user's current field of view and a rotation angle of the area of the interest point 1 is greater than or equal to the third threshold. For example, the third threshold is 20 degrees. When determining that the angle is less than or equal to the third threshold, the client may determine that the user's current field of view does not match the area of the matched interest point 1.

In Table 3, an observation point of an interest point is a fixed point. In some scenarios, the observation point may be a plurality of unfixed points. For example, the user may randomly change an observation point in a free viewpoint (Free Viewpoint) video. In consideration of this, in this embodiment, the description information of the interest point may further include an observation point. In this case, the description information of the interest point in the panoramic video is shown in the following Table 4.

TABLE 4

| Parameter | Description |
|---|---|
| Number | Number of interest points included in a panoramic video |
| Start, end | Start time and end time of an interest point 1 |
| x, y, z | Spatial coordinates of an observation point of the interest point 1 |
| Pitch | Pitch angle of the interest point 1 |
| Roll | Yaw angle of the interest point 1 |
| Yaw | Roll angle of the interest point 1 |
| Start, end | Start time and end time of an interest point 2 |
| ... | ... |

If the description information of the interest point further includes the observation point, the client further needs to determine a relationship between an observation point of the user's current field of view and the observation point of the interest point 1 when determining that the angle between the rotation angle of the user's current field of view and the rotation angle of the area of the interest point 1 is less than or equal to the third threshold. If the observation point of the user's current field of view is same as the observation point of the interest point 1, or a distance between the observation point of the user's current field of view and the observation point of the interest point 1 is less than a fourth threshold, for example, the fourth threshold is 1 m, the client uses the foregoing method. To be specific, the client calculates the user's field of view based on the area of the interest point 1. If a distance between the observation point of the user's current field of view and the observation point of the interest point 1 is greater than or equal to a fourth threshold, the client uses the observation point of the interest point 1 as an observation point of the user's field of view, and then calculates the user's field of view based on the area of the interest point 1.

It should be noted that in this embodiment, the user's current field of view and the area of the interest point may be represented in a plurality of forms, such as coordinates, a rotation angle, and a spatial vector. Therefore, if the user's current field of view and the area of the interest point are represented in different forms, the user's current field of view and the area of the interest point need to be converted into a same representation form before the user's current field of view and the area of the interest point are compared. For example, the rotation angle of the user's current field of view is converted into coordinates. A process of converting the rotation angle of the user's current field of view into the coordinates includes: calculating a display area of the user's current field of view on a 3D curved surface based on the rotation angle of the user's current field of view, for example, projecting the user's current field of view onto a spherical surface, setting an observation point at a sphere center, and calculating a projection of the user's current field of view on the spherical surface based on the rotation angle and a size of a display area of the client; and then calculating coordinates, in a 2D panoramic image, of the display area of the user's current field of view on the 3D curved surface through coordinate conversion from the 3D curved surface to the 2D panoramic image. Because a curved surface-to-plane conversion result may not be a rectangle, a minimum rectangular area including the user's current field of view may be further calculated.

In step 2, the client determines whether the user's current field of view used by the client when the user chooses to jump to play the panoramic video matches the area of the matched interest point. If the client determines that the user's current field of view does not match the area of the matched interest point, the client performs, based on the determining, step 3 in which the client calculates the user's field of view based on the area of the matched interest point; or if the client determines that the user's current field of view matches the area of the matched interest point, the client does not need to re-calculate the user's field of view.

Step 3: The client calculates the user's field of view based on the area of the matched interest point.

Step 3 may be implemented by using the following method: The client selects a pair of coordinates in the area of the matched interest point, and extracts, by using the selected coordinates as reference coordinates and in a coordinate alignment manner, an area that matches a size of the field of view from the panoramic area of the panoramic video as the user's field of view.

Figure 4A:
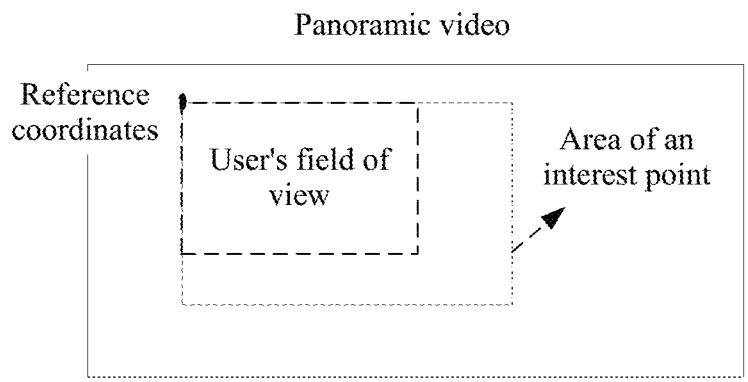
FIG. 4A is a schematic diagram of determining a user's field of view in a coordinate alignment manner according to an embodiment of the present invention.
Figure 4B:
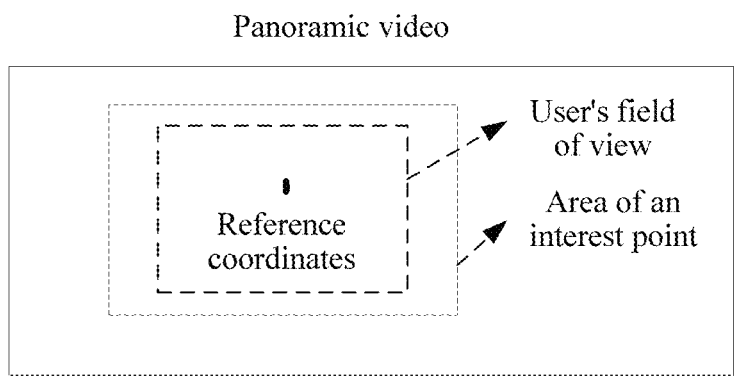
FIG. 4B is another schematic diagram of determining a user's field of view in a coordinate alignment manner according to an embodiment of the present invention.

For example, as shown in FIG. 4A, upper left corner vertex coordinates of the area of the interest point are used as the reference coordinates, and then an area that matches the size of the field of view is extracted from the panoramic area of the panoramic video as the user's field of view in the coordinate alignment manner. As shown in FIG. 4B, center point coordinates of the area of the interest point are used as the reference coordinates, and then an area that matches the size of the field of view is extracted from the panoramic area of the panoramic video as the user's field of view in the coordinate alignment manner.

Matching the size of the field of view means that a size of a field of view used by the client when the client plays the panoramic video for the user meets a related parameter specification of the client. For example, the size of the field of view is not greater than a maximum allowed field of view size of a device type of the client. The reference coordinates may be selected as the center point coordinates or the vertex coordinates of the area of the interest point.

It should be noted that if a size of the area of the matched interest point matches the size of the field of view, the client may directly determine the area of the matched interest point as the user's field of view.

Step 4: The client sets a field of view parameter of the client to the user's calculated field of view.

The field of view parameter of the client is used to represent a parameter of a user's field of view used by the client when the user views the panoramic video by using the client. A purpose of performing step 4 is that the client can subsequently jump to play the video for the user based on the specified field of view parameter.

S204. The client obtains a video corresponding to the jump time point in the panoramic video when the user's calculated field of view is used, and jumps to play the video corresponding to the jump time point when the user's calculated field of view is used.

After calculating the user's field of view, the client may obtain, in the following two manners, the video corresponding to the jump time point in the panoramic video when the user's calculated field of view is used.

Manner 1: The client obtains, from the server, the video corresponding to the jump time point in the panoramic video, and generates, based on the user's calculated field of view and the video corresponding to the jump time point, the video corresponding to the jump time point when the user's calculated field of view is used.

The foregoing Manner 1 is mainly applicable to a scenario in which the panoramic video is transmitted between the client and the server in a full-image transmission manner.

Manner 2: The client obtains, from the server, the video corresponding to the jump time point in the panoramic video when the user's field of view is used. Manner 2 specifically includes the following steps:

Step 1: The client sends, to the server, a request message used to request to obtain the video corresponding to the jump time point in the panoramic video when the user's field of view is used, where the request message carries the user's calculated field of view and the user-selected jump time point.

Step 2: After receiving the request message, the server generates, based on the user's calculated field of view and the user-selected jump time point, the video corresponding to the jump time point in the panoramic video when the user's calculated field of view is used.

Step 3: The server sends, to the client, the generated video corresponding to the jump time point in the panoramic video when the user's calculated field of view is used.

The foregoing Manner 2 is mainly applicable to a scenario in which the panoramic video is transmitted between the client and the server in a tile-based transmission manner or a field-of-view-based transmission manner.

A method used in the foregoing Manner 1 by the client to generate the video corresponding to the jump time point in the panoramic video when the user's calculated field of view is used is the same as a method used in the foregoing Manner 2 by the server to generate the video corresponding to the jump time point in the panoramic video when the user's calculated field of view is used. The method includes:

obtaining the panoramic video corresponding to the jump time point in the panoramic video, establishing a 3D image model for the panoramic video, and obtaining a projection image, on the 3D image model, of an area corresponding to the user's calculated field of view, where the obtained projection image constitutes the video corresponding to the jump time point in the panoramic video when the user's calculated field of view is used.

Figure 5:
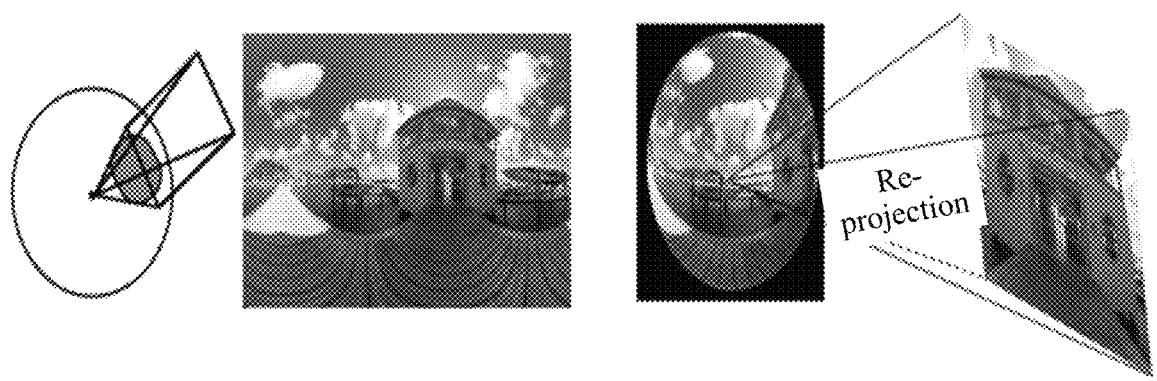
FIG. 5 is a schematic diagram of a spherical surface-to-rectangle projection principle according to an embodiment of the present invention.

Establishing the 3D image model for the panoramic video is mapping a rectangular panoramic image of the panoramic video to an established 3D curved surface based on a projection format of the panoramic image of the panoramic video. For example, when projection is performed by using a spherical surface, a spherical model may be constructed, and a texture mapping interface is invoked to map an image to the spherical surface. Generating the projection image is re-projecting a part of the 3D curved surface onto a rectangular coordinate system based on an observation point, and obtaining a rectangular image corresponding to the projection. For example, a virtual viewpoint is set at a sphere center by using a viewpoint conversion interface, and the projection image is calculated by using a projection conversion interface. As shown in FIG. 5, a schematic diagram of a spherical surface-to-rectangle projection principle, an image example of a panoramic video, a 3D reconstruction image example, and a projection image example are sequentially shown in FIG. 5 from left to right.

The client or the server may generate, by using the prior art, the video corresponding to the jump time point in the panoramic video when the user's calculated field of view is used. Details are not described herein.

In S204, when the client jumps to play the video corresponding to the jump time point when the user's calculated field of view is used, the client plays the video in the user's calculated field of view. To be specific, the client sets the field of view parameter of the client to the user's calculated field of view in step 3 in S203, and the client jumps to play, for the user based on the specified field of view parameter, the video corresponding to the jump time point when the user's calculated field of view is used.

Figure 6:
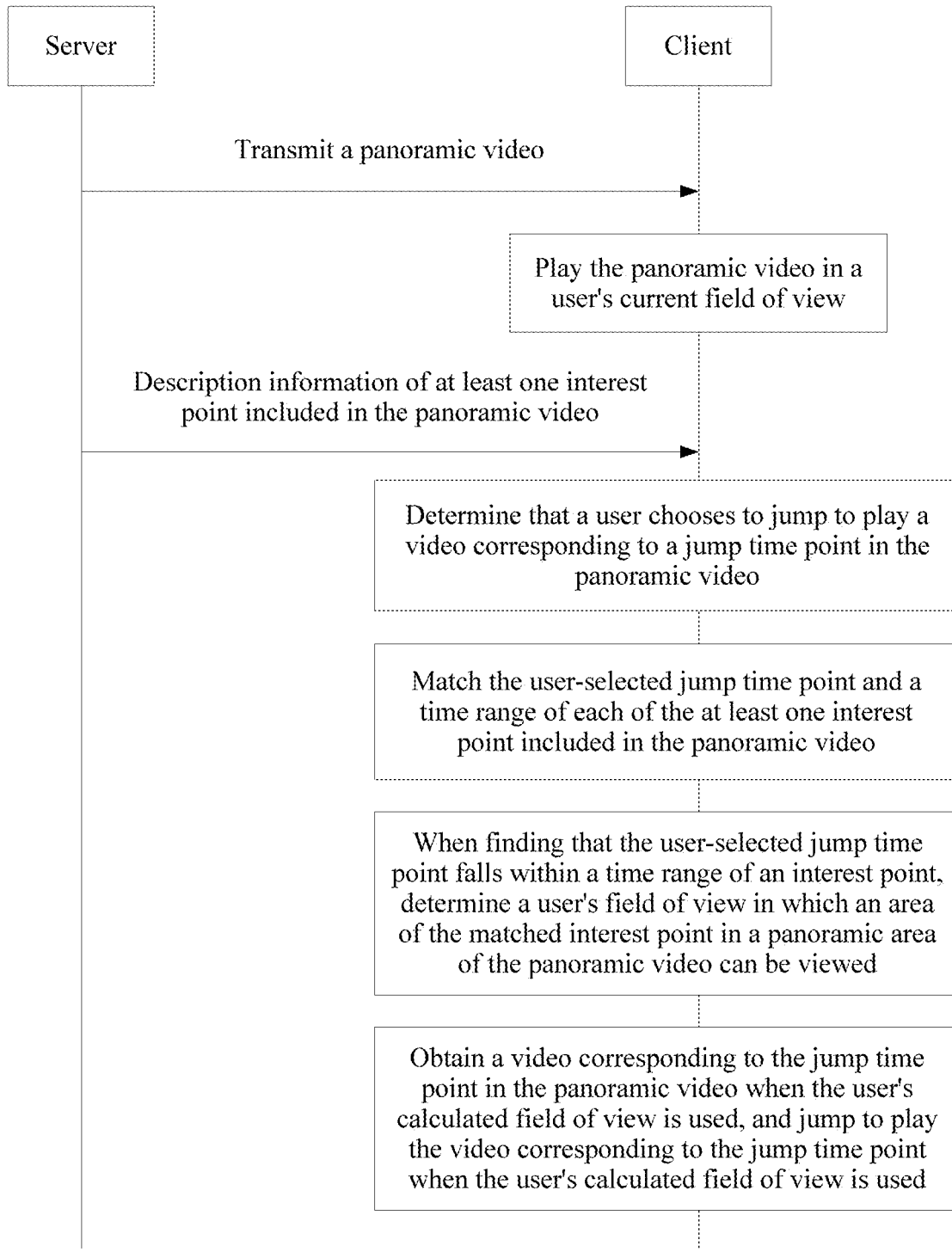
FIG. 6 is a schematic diagram of a process of interaction between a client and a server in a panoramic video playback method according to an embodiment of the present invention.

For example, corresponding to the panoramic video playback method shown in FIG. 2, FIG. 6 shows a process of interaction between a client and a server in a panoramic video playback method. For specific content, refer to the method corresponding to FIG. 2. Details are not described herein again.

In the panoramic video playback method provided in this embodiment, when the user chooses to jump to play the video corresponding to the jump time point in the panoramic video, if the client finds that the jump time point falls within the time range of the interest point in the panoramic video, the client determines the user's field of view in which the area of the matched interest point in the panoramic area of the panoramic video can be viewed, and obtains the video corresponding to the jump time point in the panoramic video when the user's field of view is used, and then jumps to play the video corresponding to the jump time point when the user's field of view is used. Therefore, in the technical solution provided in this embodiment, when the user chooses to jump to play the panoramic video corresponding to the jump time point in the panoramic video, the client can switch from the user's current field of view to the field of view in which the area of the user-selected interest point can be viewed, and jump to play, for the user, the video corresponding to the user-selected interest point in the panoramic area when the switched field of view is used. This improves user experience of viewing the panoramic video.

Embodiment 2

To resolve a prior-art problem that a technical solution in which a client plays a panoramic video for a user does not relate to a method in which the client displays a thumbnail of a related frame near an interest point in the panoramic video for the user, and consequently user experience of viewing the panoramic video is relatively poor, this embodiment of the present invention provides a panoramic video playback method, so that the client displays the thumbnail of the related frame near the interest point in the panoramic video for the user.

In this embodiment, a video playback system includes a client and a server. In this embodiment, the client may generate the thumbnail by using the method provided in this embodiment, or the server may generate the thumbnail by using the method provided in this embodiment, and then the client displays the thumbnail for the user.

Figure 7A:
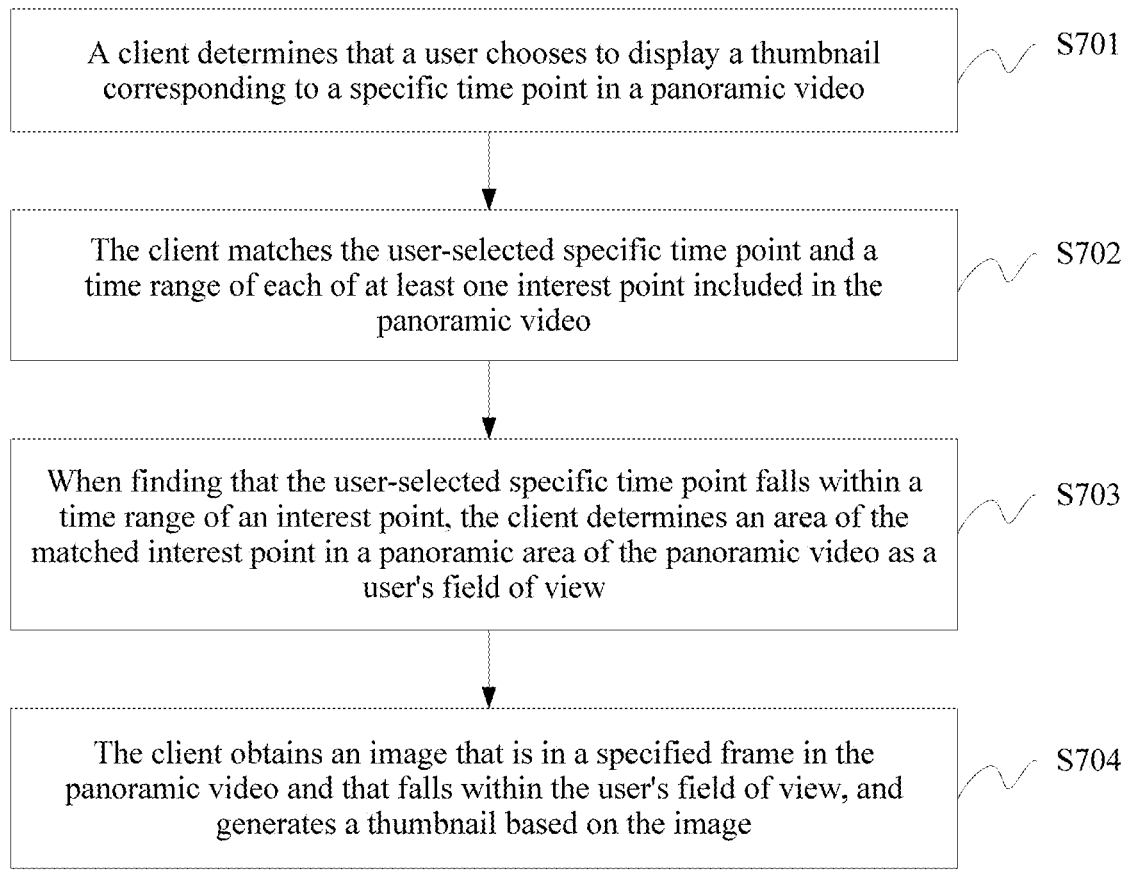
FIG. 7A is a schematic flowchart of a second panoramic video playback method according to an embodiment of the present invention.

As shown in FIG. 7A, this embodiment of the present invention provides a panoramic video playback method. In the method, a client generates a thumbnail. The method specifically includes the following steps.

S701. The client determines that a user chooses to display a thumbnail corresponding to a specific time point in a panoramic video.

The client may determine, through interaction with the user, that the user chooses to display the thumbnail corresponding to the specific time point in the panoramic video, and the specific time point may be one or more time points. For example, when the user hovers a mouse over a location on a progress bar of the panoramic video in a display area of the client, the client may calculate a time point corresponding to the mouse hover location, and the time point is the specific time point. In this case, the client determines that the user chooses to display the thumbnail corresponding to the specific time point in the panoramic video.

S702. The client matches the user-selected specific time point and a time range of each of at least one interest point included in the panoramic video.

The panoramic video may include the at least one interest point, and the interest point is a video image that is in the panoramic video and in which the user may be interested. The time range of the interest point is a time period between a start time and an end time of the interest point.

Optionally, before S702, the client obtains description information of each of the at least one interest point included in the panoramic video. The description information of the interest point in the panoramic video is usually stored in a server, and therefore the client can obtain the description information of the interest point from the server. The description information of the interest point includes the time range of the interest point and an area of the interest point. Further, the description information of the interest point may include content description information of the interest point, an observation point of the interest point, and the like. For the description information of the interest point, refer to Table 1 to Table 4 in Embodiment 1. Details are not described herein again.

S703. When finding that the user-selected specific time point falls within a time range of an interest point, the client determines an area of the matched interest point in a panoramic area of the panoramic video as a user's field of view.

Optionally, after S702, when finding that the specific time point does not fall within a time range of any interest point, the client may determine a user's current field of view in the panoramic area of the panoramic video as the user's field of view.

The area of the interest point may be represented in a plurality of forms, such as coordinates, a vector, and a rotation angle. For a specific example, refer to the content in Embodiment 1. Details are not described herein again.

S704. The client obtains an image that is in a specified frame in the panoramic video and that falls within the user's field of view, and generates a thumbnail based on the image.

The specified frame includes at least one key frame before/after the specific time point. The key frame is before/after the specific time point, and a number of key frames may be set, to display a relatively proper number of thumbnails for the user.

Optionally, in S704, the client obtains, by using the following method, the image that is in the specified frame in the panoramic video and that falls within the user's field of view:

obtaining, by the client, a panoramic image corresponding to the specified frame in the panoramic video;

establishing a 3D image model for the panoramic image; and obtaining a projection image, on the 3D image model, of an area corresponding to the user's field of view, where the projection image is the image that is in the specified frame in the panoramic video and that falls within the user's field of view.

It should be noted that the specified frame includes at least one frame, each frame has one panoramic image, and the client needs to obtain a projection image corresponding to each panoramic image.

In the foregoing method, technologies such as the 3D image model and the projection image are the same as the related descriptions in S204 in Embodiment 1, and belong to the prior art. Details are not described herein again.

After obtaining the image that is in the specified frame in the panoramic video and that falls within the user's field of view, the client may scale up/down the image based on a preset ratio, to generate the thumbnail.

Figure 8:
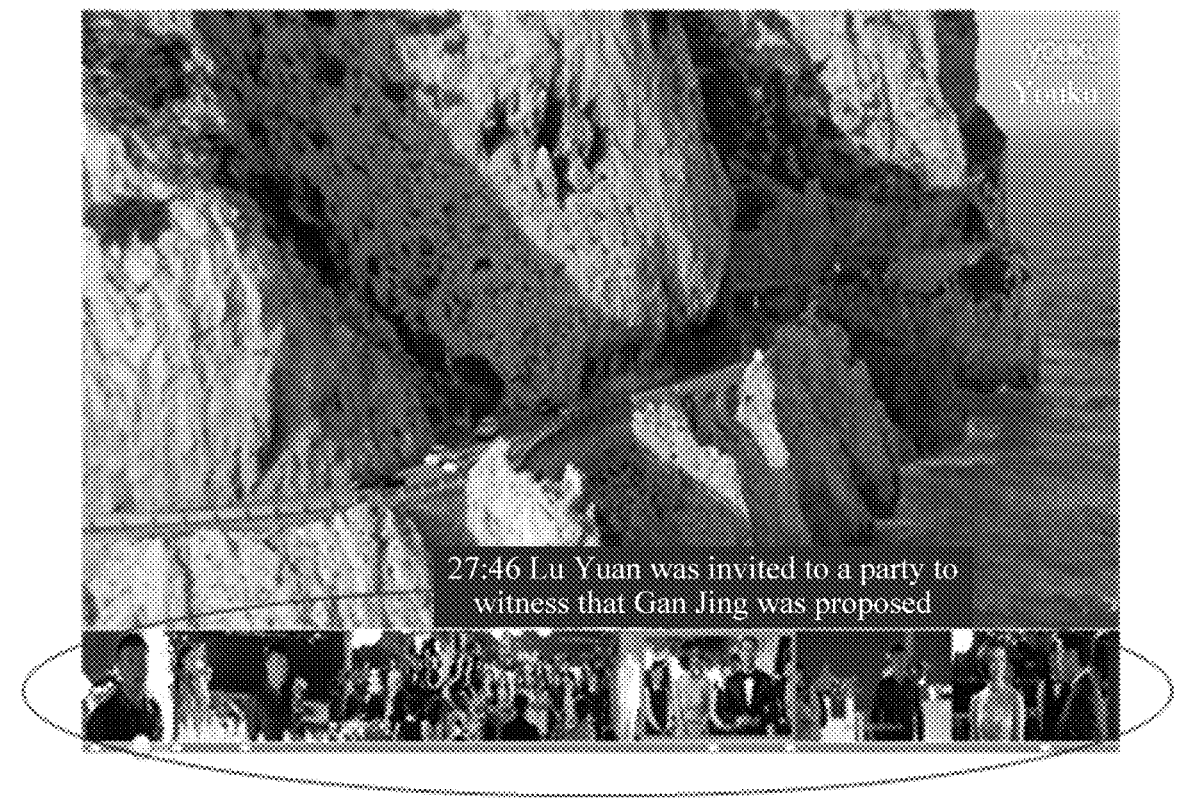
FIG. 8 is a rendering in which a client displays a thumbnail corresponding to a specified frame in a panoramic video when a user's field of view is used according to an embodiment of the present invention.

After generating the thumbnail, the client may display, at a specified location of a display interface, the thumbnail corresponding to the specified frame when the user's field of view is used. For example, the specified location of the display interface may be a location, of the display interface, over the progress bar of the panoramic video. FIG. 8 is a rendering in which a client displays a thumbnail corresponding to a specified frame in a panoramic video when a user's field of view is used. An ellipse in FIG. 8 identifies the thumbnail.

Figure 9:
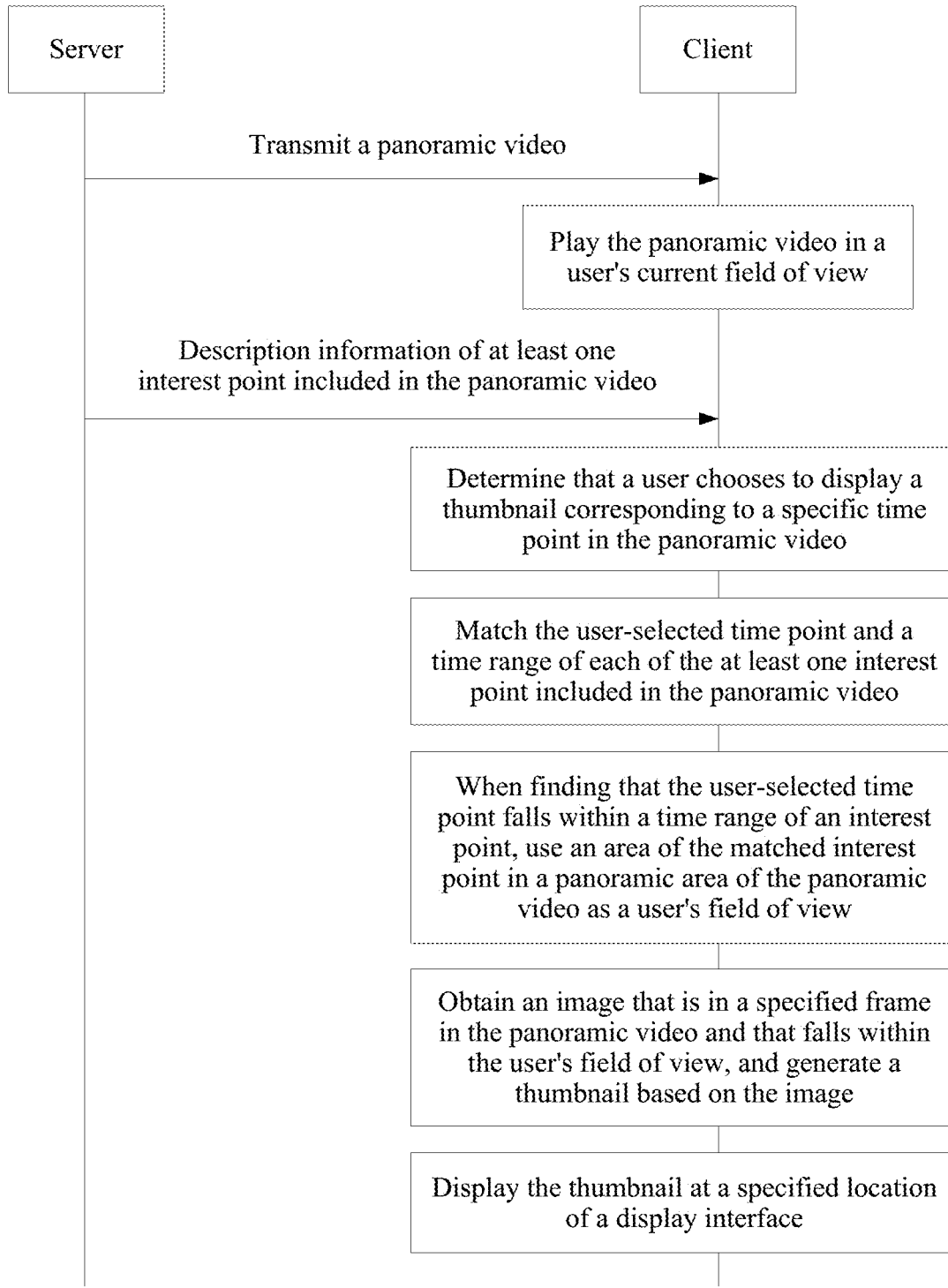
FIG. 9 shows a process of interaction between a client and a server in a panoramic video playback method according to an embodiment of the present invention.

For example, corresponding to the panoramic video playback method shown in FIG. 7A, FIG. 9 shows a process of interaction between a client and a server in a panoramic video playback method when the client generates a thumbnail. For specific content, refer to the method corresponding to FIG. 7A. Details are not described herein again.

Figure 7B:
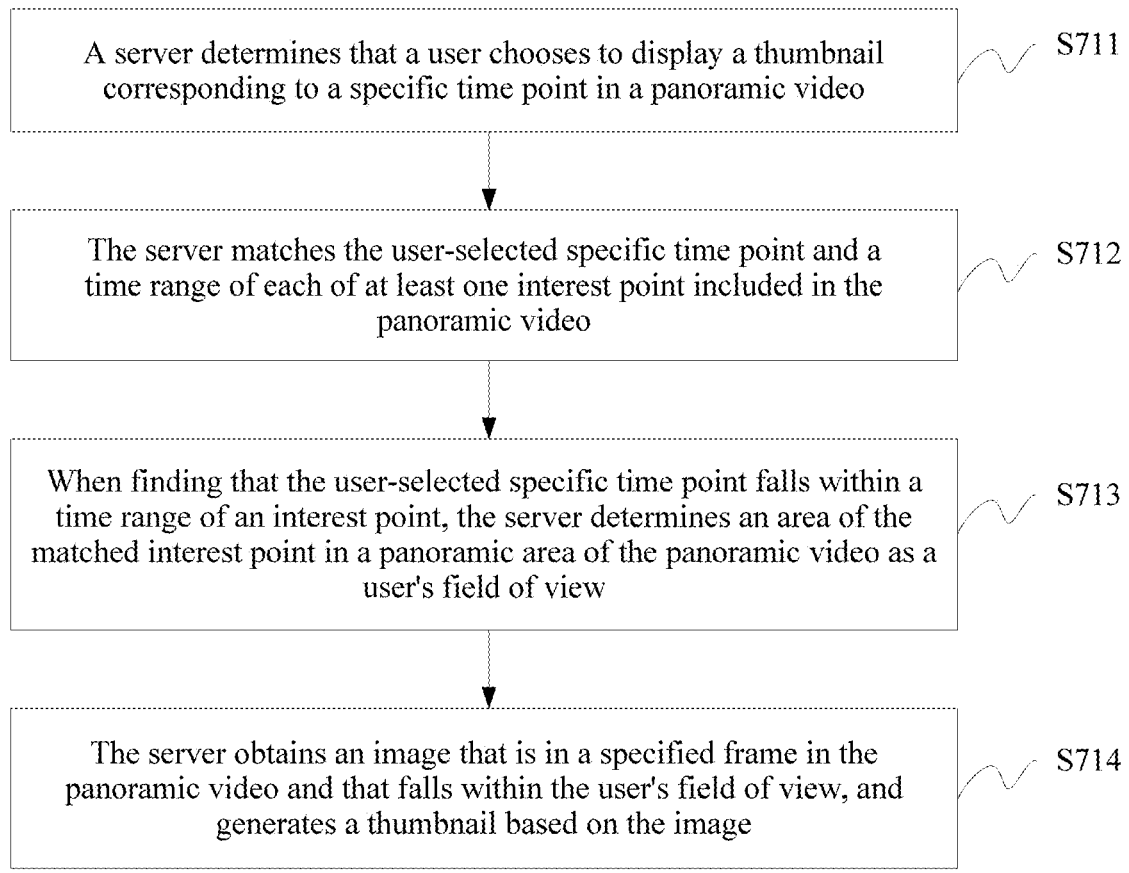
FIG. 7B is a schematic flowchart of a third panoramic video playback method according to an embodiment of the present invention.

As shown in FIG. 7B, this embodiment of the present invention provides a panoramic video playback method. In the method, a server generates a thumbnail. The method specifically includes the following steps.

S711. The server determines that a user chooses to display a thumbnail corresponding to a specific time point in a panoramic video.

A client may determine, through interaction with the user, that the user chooses to display the thumbnail corresponding to the specific time point in the panoramic video, and the server learns from the client that the user chooses to display the thumbnail corresponding to the specific time point in the panoramic video.

S712. The server matches the user-selected specific time point and a time range of each of at least one interest point included in the panoramic video.

Description information of the interest point in the panoramic video is usually stored in the server, and therefore the server locally obtains the description information of the interest point in the panoramic video.

S713. When finding that the user-selected specific time point falls within a time range of an interest point, the server determines an area of the matched interest point in a panoramic area of the panoramic video as a user's field of view.

Optionally, after S712, when finding that the specific time point does not fall within a time range of any interest point, the server may determine a user's current field of view in the panoramic area of the panoramic video as the user's field of view.

S714. The server obtains an image that is in a specified frame in the panoramic video and that falls within the user's field of view, and generates a thumbnail based on the image.

After generating the thumbnail, the server sends the generated thumbnail to the client, so that the client displays, at a specified location of a display interface, the thumbnail corresponding to the specified frame when the user's field of view is used.

Because the specific method procedure shown in FIG. 7B is similar to the specific method procedure shown in FIG. 7A, details are not described herein again.

Figure 10:
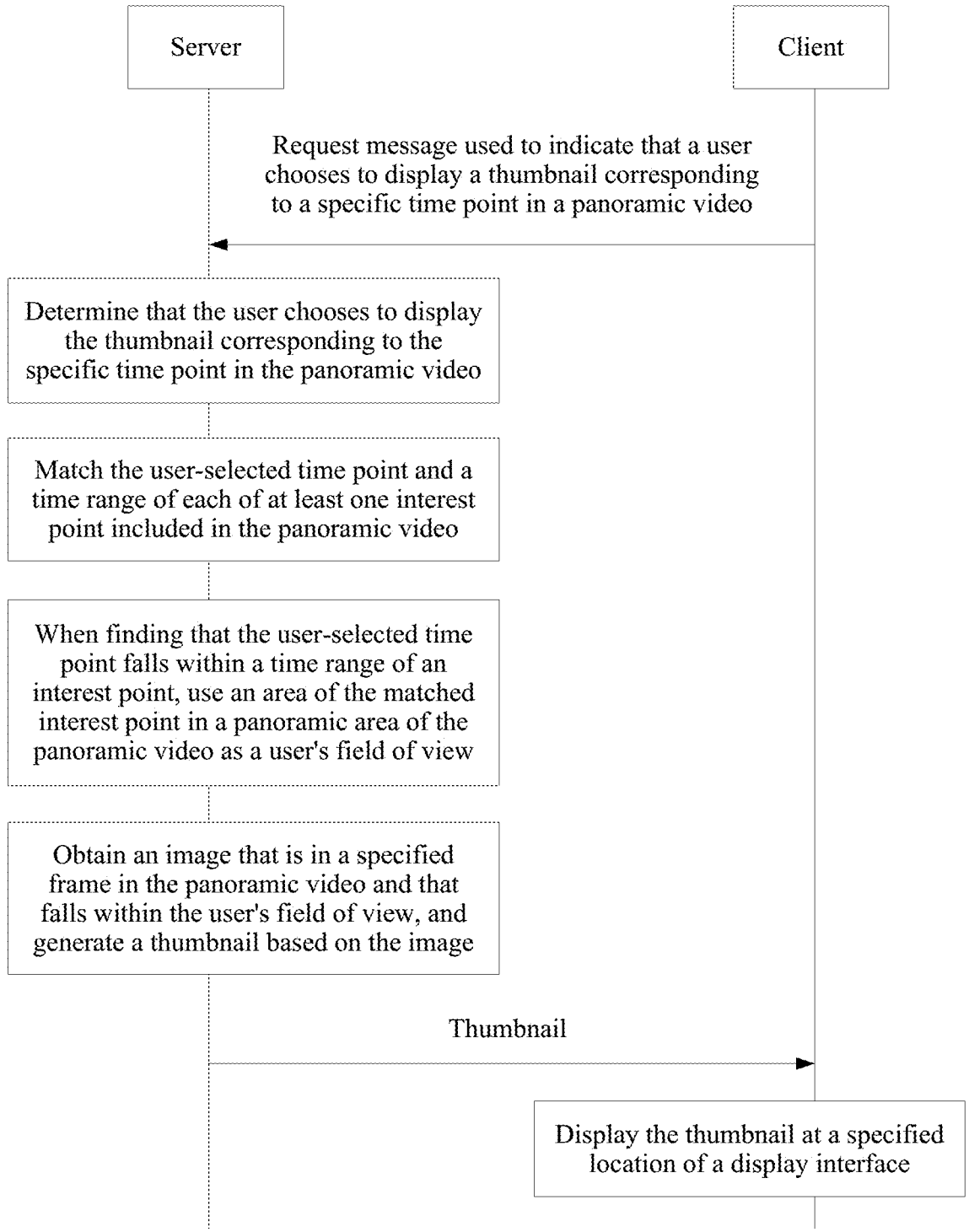
FIG. 10 shows another process of interaction between a client and a server in a panoramic video playback method according to an embodiment of the present invention.

For example, corresponding to the panoramic video playback method shown in FIG. 7B, FIG. 10 shows a process of interaction between a client and a server in a panoramic video playback method when the server generates a thumbnail. For specific content, refer to the method corresponding to FIG. 7B. Details are not described herein again.

It should be noted that the method provided in Embodiment 2 may be independently implemented, or may be implemented in combination with the method provided in Embodiment 1. For example, the client may first display a thumbnail of a segment in the panoramic video for the user, and then determine, after the user previews the thumbnail, whether to choose to jump to play a video of the segment in the panoramic video.

In the panoramic video playback method provided in this embodiment, when the video playback system determines that the user chooses to display the thumbnail corresponding to the specific time point in the panoramic video, if the video playback system finds that the user-selected specific time point falls within the time range of the interest point in the panoramic video, the video playback system determines the area of the matched interest point in the panoramic area of the panoramic video as the user's field of view, and then, obtains the image that is in the specified frame in the panoramic video and that falls within the user's field of view, and generates the thumbnail based on the image. The client displays, for the user, the thumbnail corresponding to the user-selected specific time point in the panoramic video, and then the client displays a thumbnail of a related frame near the interest point in the panoramic video for the user. This improves user experience of viewing the panoramic video.

Embodiment 3

Figure 11:
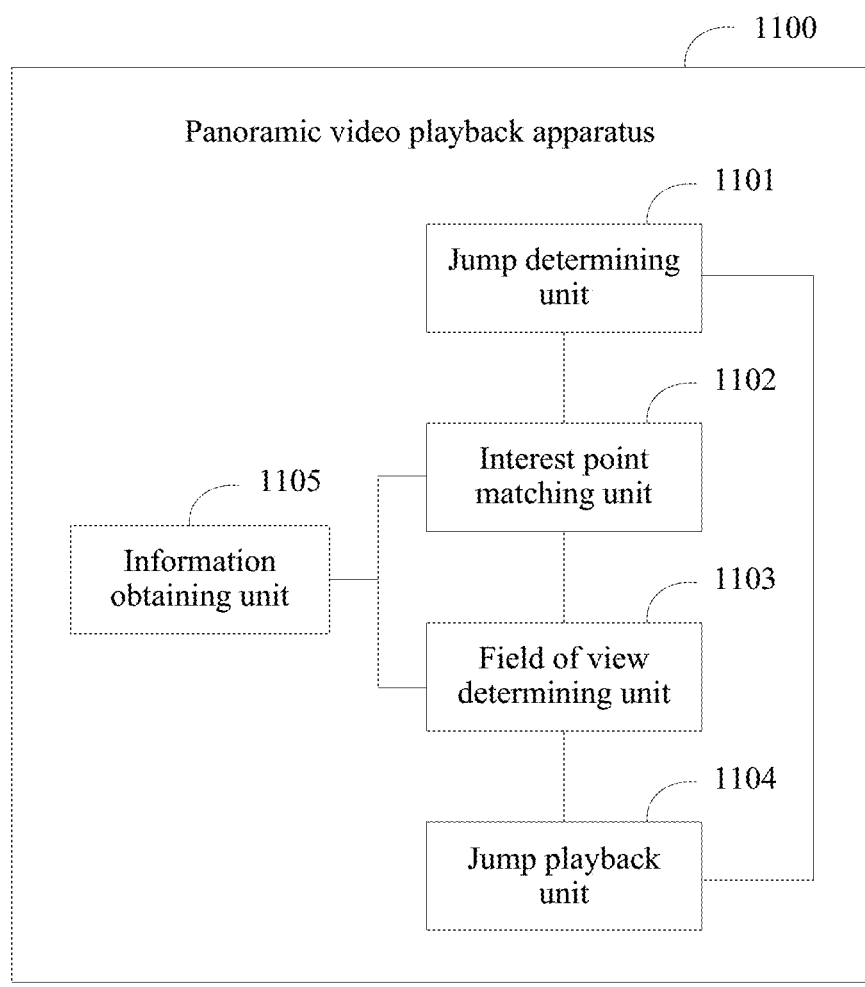
FIG. 11 is a schematic structural diagram of a first panoramic video playback method apparatus according to an embodiment of the present invention.

Based on the foregoing Embodiment 1, this embodiment of the present invention further provides a panoramic video playback apparatus. The apparatus may use the method provided in Embodiment 1 corresponding to FIG. 2, and the apparatus is applied to a client. Referring to FIG. 11, a panoramic video playback apparatus 1100 includes a jump determining unit 1101, an interest point matching unit 1102, a field of view determining unit 1103, and a jump playback unit 1104. Optionally, the apparatus 1100 further includes an information obtaining unit 1105.

The jump determining unit 1101 is configured to determine that a user chooses to jump to play a video corresponding to a jump time point in a panoramic video.

The interest point matching unit 1102 is configured to match the jump time point determined by the jump determining unit 1101 and a time range of each of at least one interest point included in the panoramic video.

The field of view determining unit 1103 is configured to: when the interest point matching unit 1102 finds that the time point falls within a time range of an interest point, determine a user's field of view in which an area of the matched interest point in a panoramic area of the panoramic video can be viewed.

The jump playback unit 1104 is configured to: obtain a video corresponding to the time point in the panoramic video when the user's field of view determined by the field of view determining unit 1103 is used, where the time point is determined by the jump determining unit 1101, and jump to play the video corresponding to the time point when the user's field of view is used.

Optionally, the information obtaining unit 1105 is configured to: before the interest point matching unit 1102 matches the time point and the time range of each of the at least one interest point included in the panoramic video, obtain, from a server, description information of each of the at least one interest point included in the panoramic video, where the description information of the interest point includes the time range of the interest point and an area of the interest point.

Optionally, the field of view determining unit 1103 is specifically configured to:

determine the area of the matched interest point; and calculate the user's field of view based on the area of the matched interest point, and set a field of view parameter of the client to the user's calculated field of view, where the field of view parameter of the client is used to represent a parameter of a user's field of view used by the client when the user views the panoramic video by using the client.

Optionally, the field of view determining unit 1103 is further configured to:

before calculating the user's field of view based on the area of the matched interest point, determine that a user's current field of view used by the client when the user chooses to jump to play the panoramic video does not match the area of the matched interest point, and perform, based on the determining, the operation of calculating the user's field of view based on the area of the matched interest point.

That a user's current field of view does not match the area of the matched interest point includes:

a size of an overlapping area between the user's current field of view and the area of the matched interest point is less than or equal to a first threshold; or an angle between a vector of the user's current field of view and a vector of the area of the matched interest point is greater than or equal to a second threshold; or an angle between a rotation angle of the user's current field of view and a rotation angle of the area of the matched interest point is greater than or equal to a third threshold.

Optionally, when calculating the user's field of view based on the area of the matched interest point, the field of view determining unit 1103 is specifically configured to:

select a pair of coordinates in the area of the matched interest point, and extract, by using the coordinates as reference coordinates and in a coordinate alignment manner, an area that matches a size of the field of view from the panoramic area of the panoramic video as the user's field of view.

Optionally, when obtaining the video corresponding to the time point in the panoramic video when the user's field of view is used, the jump playback unit 1104 is specifically configured to:

obtain, from the server, the video corresponding to the time point in the panoramic video, and generate, based on the user's field of view and the video corresponding to the time point, the video corresponding to the time point when the user's field of view is used; or obtain, from the server, the video corresponding to the time point in the panoramic video when the user's field of view is used.

In the apparatus 1100, for a specific function of the jump determining unit 1101, refer to S201 in Embodiment 1; for a specific function of the interest point matching unit 1102, refer to S202 in Embodiment 1; for a specific function of the field of view determining unit 1103, refer to S203 in Embodiment 1; and for a specific function of the jump playback unit 1104, refer to S204 in Embodiment 1. Details are not described herein again.

It should be noted that the unit division in this embodiment of the present invention is an example and is merely logical function division. There may be another division manner during actual implementation. In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

Figure 12:
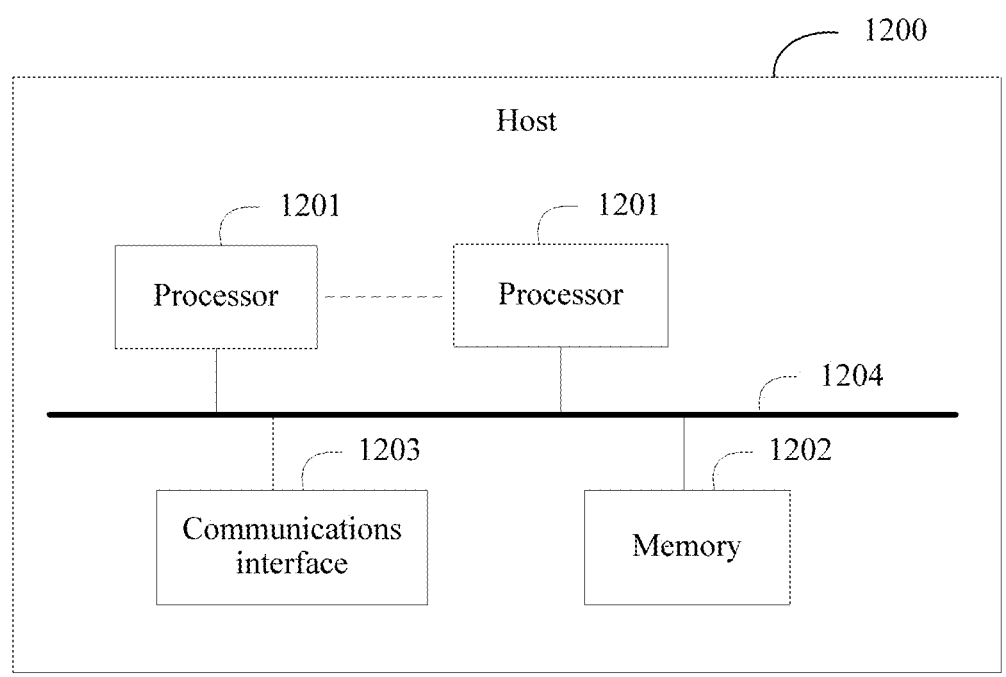
FIG. 12 is a schematic structural diagram of a second panoramic video playback apparatus according to an embodiment of the present invention.

This embodiment of the present invention further provides a panoramic video playback apparatus. The apparatus may use the method provided in Embodiment 1 corresponding to FIG. 2, the apparatus may be a device that is the same as the apparatus shown in FIG. 11, and the apparatus is applied to a client. Referring to FIG. 12, a host 1200 of a panoramic video playback apparatus includes at least one processor 1201, a memory 1202, and a communications interface 1203. The at least one processor 1201, the memory 1202, and the communications interface 1203 are all connected by using a bus 1204.

The memory 1202 is configured to store a computer executable instruction.

The at least one processor 1201 is configured to execute the computer executable instruction stored in the memory 1202, so that the host 1200 exchanges data with a host of a server by using the communications interface 1203, to perform the panoramic video playback method provided in the foregoing embodiment.

The at least one processor 1201 may include different types of processors 1201, or include one type of processor 1201. The processor 1201 may be any one of the following components with a calculation and processing capability: a central processing unit (Central Processing Unit, CPU for short), an ARM processor, a field programmable gate array (Field Programmable Gate Array, FPGA for short), a dedicated processor, and the like. In an optional implementation, the at least one processor 1201 may be further integrated into a many-core processor.

The memory 1202 may be any one or any combination of the following storage media: a random access memory (Random Access Memory, RAM for short), a read-only memory (read-only memory, ROM for short), a nonvolatile memory (nonvolatile memory, NVM for short), a solid state drive (Solid State Drive, SSD for short), a mechanical hard disk, a magnetic disk, a disk array, and the like.

The communications interface 1203 is used by the host 1200 to exchange data with another device (for example, the host of the server). The communications interface 1203 may be any one or any combination of the following components with a network access function: a network interface (for example, an Ethernet interface), a wireless network interface card, and the like.

The bus 1204 may include an address bus, a data bus, a control bus, and the like. For ease of representation, the bus is represented by using a thick line in FIG. 12. The bus 1204 may be any one or any combination of the following components for wired data transmission: an industry standard architecture (Industry Standard Architecture, ISA for short) bus, a peripheral component interconnect (Peripheral Component Interconnect, PCI for short) bus, an extended industry standard architecture (Extended Industry Standard Architecture, EISA for short) bus, and the like.

Embodiment 4

Based on the foregoing Embodiment 2, this embodiment of the present invention further provides a panoramic video playback apparatus. The apparatus may use the methods provided in Embodiment 2 corresponding to FIG. 7A and FIG. 7B, and the apparatus is applied to a video playback system. The video playback system may include a client or a server. When the video playback system includes the client, the apparatus is applied to the client and is configured to generate a thumbnail; or when the video playback system includes the server, the apparatus is applied to the server and is configured to generate a thumbnail, and then the client displays the thumbnail for a user.

Figure 13:
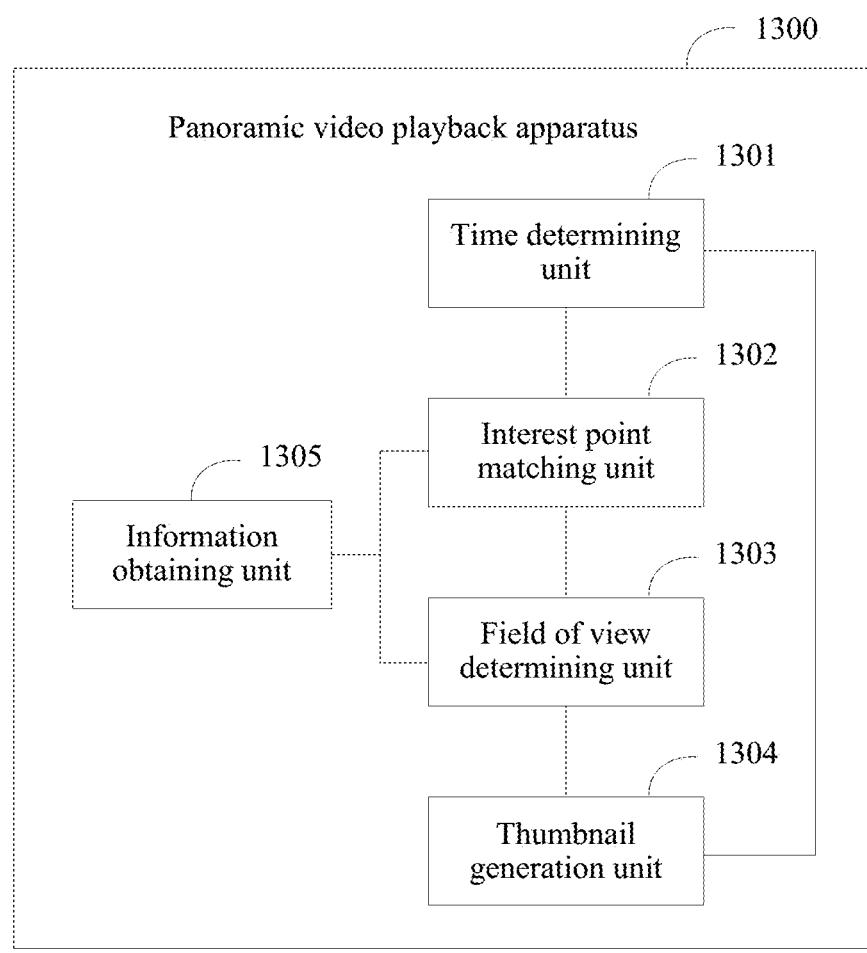
FIG. 13 is a schematic structural diagram of a third panoramic video playback apparatus according to an embodiment of the present invention.

Referring to FIG. 13, a panoramic video playback apparatus 1300 includes a time determining unit 1301, an interest point matching unit 1302, a field of view determining unit 1303, and a thumbnail generation unit 1304. Optionally, the apparatus 1300 further includes an information obtaining unit 1305.

The time determining unit 1301 is configured to determine that a user chooses to display a thumbnail corresponding to a specific time point in a panoramic video.

The interest point matching unit 1302 is configured to match the time point determined by the time determining unit 1301 and a time range of each of at least one interest point included in the panoramic video.

The field of view determining unit 1303 is configured to: when the interest point matching unit 1302 finds that the time point falls within a time range of an interest point, determine an area of the matched interest point in a panoramic area of the panoramic video as a user's field of view.

The thumbnail generation unit 1304 is configured to: obtain an image that is in a specified frame in the panoramic video and that falls within the user's field of view determined by the field of view determining unit 1303, and generate a thumbnail based on the image, where the specified frame includes at least one key frame before/after the time point.

Optionally, the field of view determining unit 1303 is further configured to:

when the interest point matching unit 1302 finds that the time point does not fall within a time range of any interest point, determine a user's current field of view in the panoramic area of the panoramic video as the user's field of view.

Optionally, the information obtaining unit 1305 is configured to: before the interest point matching unit 1302 matches the time point and the time range of each of the at least one interest point included in the panoramic video, obtain description information of each of the at least one interest point included in the panoramic video, where the description information of the interest point includes the time range of the interest point and an area of the interest point.

Optionally, when obtaining the image that is in the specified frame in the panoramic video and that falls within the user's field of view, the thumbnail generation unit 1304 is specifically configured to:

obtain a panoramic image corresponding to the specified frame in the panoramic video;

establish a 3D image model for the panoramic image; and obtain a projection image, on the 3D image model, of an area corresponding to the user's field of view.

In the apparatus 1300, for a specific function of the time determining unit 1301, refer to S701 or S711 in Embodiment 2; for a specific function of the interest point matching unit 1302, refer to S702 or S712 in Embodiment 2; for a specific function of the field of view determining unit 1303, refer to S703 or S713 in Embodiment 2; and for a specific function of the thumbnail generation unit 1304, refer to S704 or S714 in Embodiment 2. Details are not described herein again.

It should be noted that the unit division in this embodiment of the present invention is an example and is merely logical function division. There may be another division manner during actual implementation. In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

Figure 14:
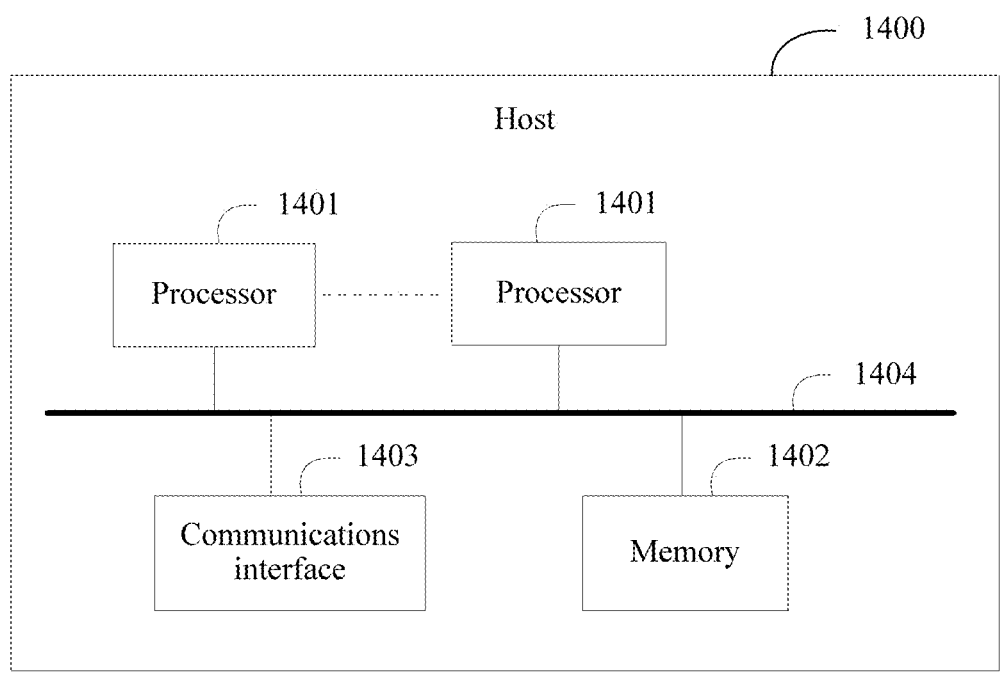
FIG. 14 is a schematic structural diagram of a fourth panoramic video playback apparatus according to an embodiment of the present invention.

This embodiment of the present invention further provides a panoramic video playback apparatus. The apparatus may use the methods provided in Embodiment 2 corresponding to FIG. 7A and FIG. 7B, the apparatus may be a device that is the same as the apparatus shown in FIG. 13, and the apparatus is applied to a video playback system. Referring to FIG. 14, a host 1400 of a panoramic video playback apparatus includes at least one processor 1401, a memory 1402, and a communications interface 1403. The at least one processor 1401, the memory 1402, and the communications interface 1403 are all connected by using a bus 1404.

The memory 1402 is configured to store a computer executable instruction.

The at least one processor 1401 is configured to execute the computer executable instruction stored in the memory 1402, so that the host 1400 exchanges data with another host of the video playback system by using the communications interface 1403, to perform the thumbnail generation methods during panoramic video playback that are provided in the foregoing embodiment.

The at least one processor 1401 may include different types of processors 1401, or include one type of processor 1401. The processor 1401 may be any one of the following components with a calculation and processing capability: a CPU, an ARM processor, an FPGA, a dedicated processor, and the like. In an optional implementation, the at least one processor 1401 may be further integrated into a many-core processor.

The memory 1402 may be any one or any combination of the following storage media: a RAM, a ROM, an NVM, an SSD, a mechanical hard disk, a magnetic disk, a disk array, and the like.

The communications interface 1403 is used by the host 1400 to exchange data with the another host of the video playback system. The communications interface 1403 may be any one or any combination of the following components with a network access function: a network interface (for example, an Ethernet interface), a wireless network interface card, and the like.

The bus 1404 may include an address bus, a data bus, a control bus, and the like. For ease of representation, the bus is represented by using a thick line in FIG. 14. The bus 1404 may be any one or any combination of the following components for wired data transmission: an ISA bus, a PCI bus, an EISA bus, and the like.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions may be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the example embodiments of the present invention have been described, persons skilled in the art can make additional changes and modifications to these embodiments once they learn the basic inventive concept. Therefore, the following claims are intended to be construed as to cover the example embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that these modifications and variations of the embodiments of the present invention fall within the scope of the claims of the present invention and their equivalent technologies.

What is claimed is:

1. A panoramic video playback method, comprising:
determining, by a video playback system, that a user has chosen to display a thumbnail corresponding to a specific time point in a panoramic video, the panoramic video comprising at least one interest point, and each interest point of the at least one interest point comprising a time range and an area;
matching, by the video playback system, the specific time point with the time range of a matched interest point of the at least one interest point comprised in the panoramic video;
determining, by the video playback system, a field of view of the user in which the area of the matched interest point in a panoramic area of the panoramic video is viewed, wherein determining the field of view of the user comprises determining whether a size of an overlapping area between a current field of view of the user and the area of the matched interest point is greater than a first threshold;
obtaining, by the video playback system, an image that is in a specified frame in the panoramic video and that falls within the determined field of view of the user, the specified frame comprising at least one key frame before or after the specific time point; and
generating, by the video playback system, the thumbnail based on the image.

2. The method according to claim 1, further comprising:
determining, by the video playback system, that the user has chosen to display another thumbnail corresponding to another time point in the panoramic video;
determining, by the video playback system, that the another time point fails to match the at least one interest point comprised in the panoramic video; and
determining, by the video playback system in response to determining that the another time point fails to match the at least one interest point, the current field of view of the user in the panoramic area of the panoramic video as the determined field of view of the user.

3. The method according to claim 1, further comprising:
obtaining, by the video playback system, description information of each interest point of the at least one interest point comprised in the panoramic video, the description information of the interest point comprising the time range of the interest point and the area of the interest point.

4. The method according to claim 1, wherein obtaining the image that is in the specified frame in the panoramic video comprises:
obtaining, by the video playback system, a panoramic image corresponding to the specified frame in the panoramic video;
establishing, by the video playback system, a 3D image model for the panoramic image; and
obtaining, by the video playback system, a projection image, on the 3 D image model, of an area corresponding to the determined field of view of the user.

5. The method according to claim 1, further comprising:
determining, by the video playback system, that the user indicates to jump to play a video corresponding to a jump time point in the panoramic video;
matching, by the video playback system, the jump time point with another time range of another interest point of the at least one interest point comprised in the panoramic video;
determining, by the video playback system, another field of view of the user in which another area of the another interest point in another panoramic area of the panoramic video is viewed; and
obtaining, by the video playback system, a video corresponding to the jump time point in the panoramic video when the another field of view of the user is used, and jumping to play the video corresponding to the jump time point when the user's field of view is used.

6. A panoramic video playback apparatus, comprising:
one or more processors; and
at least one non-transitory computer-readable memory storing a program to be executed by the one or more processors, the program comprising instructions that, when executed by the one or more processors, cause the panoramic video playback apparatus to execute operations comprising:
determining that a user has chosen to display a thumbnail corresponding to a specific time point in a panoramic video, the panoramic video comprising at least one interest point, and each interest point of the at least one interest point comprising a time range and an area;
matching the specific time point with the time range of a matched interest point of the at least one interest point comprised in the panoramic video;
determining a field of view of the user in Which the area of the matched interest point in a panoramic area of the panoramic video is viewed, wherein determining the field of view of the user comprises determining Whether a size of an overlapping area between a current field of view of the user and the area of the matched interest point is greater than a first threshold;
obtaining an image that is in a specified frame in the panoramic video and that falls within the determined field of view of the user, the specified frame comprising at least one key frame before or after the specific time point; and
generating the thumbnail based on the image.

7. The panoramic video playback apparatus according to claim 6, the program further comprising instructions that, when executed by the one or more processors, cause the panoramic video playback apparatus to execute operations comprising:
determining, when another time point fails to match the at least one interest point comprised in the panoramic video, the current field of view of the user in the panoramic area of the panoramic video as the determined field of view of the user.

8. The panoramic video playback apparatus according to claim 6, the program further comprising instructions that, when executed by the one or more processors, cause the panoramic video playback apparatus to execute operations comprising:
obtaining description information of each interest point of the at least one interest point comprised in the panoramic video, the description information of the interest point comprising the time range of the interest point and the area of the interest point.

9. The panoramic video playback apparatus according to claim 6, wherein instructions for obtaining the image that is in the specified frame in the panoramic video comprise further instructions that, when executed by the one or more processors, cause the panoramic video playback apparatus to execute operations comprising:

obtaining a panoramic image corresponding to the specified frame in the panoramic video;

establishing a 3D image model for the panoramic image; and obtaining a projection image, on the 3D image model, of an area corresponding to the determined field of view of the user.

10. The panoramic video playback apparatus according to claim 6, the program further comprising instructions that, when executed by the one or more processors, cause the panoramic video playback apparatus to execute operations comprising:

determine that the user indicates to jump to play a video corresponding to a jump time point in the panoramic video;

match the jump time point with another time range of another interest point of the at least one interest point comprised in the panoramic video;

determine another field of view of the user in which another area of the another interest point in another panoramic area of the panoramic video is viewed; and obtain a video corresponding to the jump time point in the panoramic video when the another field of view of the user is used, and jumping to play the video corresponding to the jump time point when the user's field of view is used.

\* \* \* \* \*